US012653221B2

(12) United States Patent
Becker et al.

(10) Patent No.: US 12,653,221 B2
(45) Date of Patent: Jun. 16, 2026

(54) COATED GRANULES PRODUCED BY IN-SITU CROSSLINKING PROCESS

(71) Applicant: DANISCO US INC, Palo Alto, CA (US)

(72) Inventors: Nathaniel T Becker, Burlingame, CA (US); Douglas A Dale, Pacifica, CA (US); Ryan M Kawakita, Davis, CA (US); Herbert B Scher, Davis, CA (US); Scott A Strobel, Davis, CA (US); Tina Jeoh Zicari, Davis, CA (US)

(73) Assignee: DANISCO US INC., Palo Alto, CA (US)

( * ) Notice: Subject to any disclaimer, the term of this patent is extended or adjusted under 35 U.S.C. 154(b) by 341 days.

(21) Appl. No.: 18/247,287

(22) PCT Filed: Sep. 22, 2021

(86) PCT No.: PCT/US2021/051469
§ 371 (c)(1),
(2) Date: Mar. 30, 2023

(87) PCT Pub. No.: WO2022/072193
PCT Pub. Date: Apr. 7, 2022

(65) Prior Publication Data
US 2023/0404130 A1     Dec. 21, 2023

Related U.S. Application Data

(60) Provisional application No. 63/085,669, filed on Sep. 30, 2020.

(51) Int. Cl.
| | |
|---|---|
| *A23P 10/30* | (2016.01) |
| *A23K 20/105* | (2016.01) |
| *A23K 20/163* | (2016.01) |
| *A23K 20/189* | (2016.01) |
| *A23K 20/22* | (2016.01) |

(Continued)

(52) U.S. Cl.
CPC ........... *A23P 10/30* (2016.08); *A23K 20/105* (2016.05); *A23K 20/163* (2016.05); *A23K 20/189* (2016.05); *A23K 20/22* (2016.05); *A23K 20/24* (2016.05); *A23K 40/30* (2016.05)

(58) Field of Classification Search
None
See application file for complete search history.

(56) References Cited

U.S. PATENT DOCUMENTS

2014/0348815 A1* 11/2014 Jeoh-Zicari ........... B01J 13/046
536/3

OTHER PUBLICATIONS

Agyilirah, George A., et al. "Evaluation of the gastric retention properties of a cross-linked polymer coated tablet versus those of a non-disintegrating tablet" International Journal of Pharmaceutics, vol. 75, p. 241-247, published 1991 [accessed online Apr. 4, 2025] (Year: 1991).*

* cited by examiner

*Primary Examiner* — Jeffrey D Washville

(57) ABSTRACT

Described are compositions and methods relating to a coated granule comprising a core coated with cross-linkable polymer, where the cross-linkable polymer is applied using a feed suspension that includes an acid-neutralized volatile base and a calcium salt insoluble at the pH of the neutralized feed suspension. Volatilization of the base decreases the pH of the feed suspension, thereby solubilizing the calcium salt, and inducing in situ ion-mediated cross-linking of the cross-linkable polymer.

25 Claims, 5 Drawing Sheets

(51) Int. Cl.
    *A23K 20/24*         (2016.01)
    *A23K 40/30*         (2016.01)

E-p2

$EA_N^{2.0}$-p2

$EA_C^{2.0}$-p2

$EA_C^{2.5}$-p2

$EA_C^{3.0}$-p2

E

EP

EPA$_C^{2.0}$

COATED GRANULES PRODUCED BY IN-SITU CROSSLINKING PROCESS

CROSS-REFERENCE TO RELATED APPLICATIONS

The present application is a 371 of International Application No. PCT/US2021/051469, filed Sep. 22, 2021 and claims priority to U.S. Provisional Patent Application Ser. No. 63/085,669, filed Sep. 30, 2020, which are hereby incorporated by reference in their entirety.

FIELD OF THE INVENTION

The described compositions and methods relate to coated granules for encapsulating benefit agents such as small molecules, macromolecules and organisms. The granules comprise a core coated with a cross-linkable polymer matrix comprising the benefit agent. Calcium ion-mediated cross-linking of a cross-linkable polymer, such as alginate, is brought about in situ in a coating apparatus, using a method in which a feed suspension comprising the benefit agent, a cross-linkable polymer, an acid neutralized with a volatile base and a calcium salt that is insoluble at the pH of the neutralized feed suspension are coated onto the cores, such that volatilization of the base reduces the pH, thereby solubilizing the calcium salt, and inducing cross-link formation within the coating.

BACKGROUND

In enzyme coating processes such as fluidized bed spray-coating, typically one or more enzyme layers are deposited onto inert carrier, or core, particles by atomizing an aqueous enzyme solution that is sprayed onto the core particles while they are fluidized. The enzyme-coated core particles are typically overcoated by one or more protective coatings. Application of the enzyme to the core often results in a coated layer that is vulnerable to mechanical damage, attrition and dust formation, both during and after completion of the coating process. In addition, the enzyme layer must often be applied at a slow rate, to avoid agglomeration.

Enzyme coating processes generally require multiple coating steps and are limited by the rate at which the coating may be applied. Recurring problems encountered during fluidized bed spray-coating include high agglomeration, production of fines and dust, low coating efficiency, and attrition. Fine enzyme powders and aerosols arising in handling and processing enzyme granules can induce sensitization or allergenic response, so enzyme manufacturers have adopted attrition tests such as the Heubach dust test to characterize enzyme granules, and there is a need to develop granules with reduced Heubach dust. Process parameters (spray rate, air temperature, atomization pressure etc.), as well as material and physical properties of the coating suspension (enzymes, fermentation co-products and impurities, carriers, binders and other additives), can significantly influence the magnitude of these problems. While water soluble polymeric binders such as polyvinyl alcohol, polyvinyl pyrrolidone, polyacrylate, polymethacrylate, methyl cellulose, hydroxypropyl methyl cellulose, and copolymers, thereof, are commonly used as binders, matrix-forming polymers such as alginate and carrageenan offer natural alternatives, with the additional potential of introducing non-covalent cross-linking to encapsulate the enzyme and improve mechanical strength of the particle and coatings. Of the naturally-derived binding agents, alginate is perhaps the most commonly used for encapsulation due to its relatively low cost, safe handling, biocompatibility, and gel forming ability. In the presence of calcium and other multivalent cations, carboxylate groups along alternating and/or repeating units of $\beta$-D-mannuronic acid and $\alpha$-L-guluronic acid, which make up alginate's backbone, cross-link the linear polymer chains, thereby forming a gel structure.

Although forming cross-linked alginate particles or (micro)capsules is a well-established laboratory technique, this technology has to date been applied only to form matrix type encapsulates, wherein the alginate and active ingredient are combined and atomized or otherwise dispersed into aqueous droplets, which are subsequently cross-linked by contacting with calcium or another divalent cation in a separate collection bath, then separated and finally dried. This two-step approach would not be feasible to practice in a typical coating process, since spray-coating goes from the liquid feed mixture to a dry particle in one, rapid step. Forming uniform cross-linked alginate coatings on granular particles is non-trivial, because cross-linking of such polymers typically requires as many as four distinct steps: (i) applying the non-cross-linked polymer to form a continuous coating; (ii) contacting the coated granule with an aqueous solution containing the multivalent cation or other cross-linking group; (iii) separating the coated particles from the cross-linking bath; and (iv) drying, while ensuring separation of, the wet particles in order to remove entrained or free water and ensure a free-flowing powder. The solid-liquid separation process itself is fraught with difficulties in handling and can result in significant losses in activity or yield.

The need exists to improve existing spray-coating processes and formulations for producing coated enzyme granules used in several industrial markets, including cleaning and animal feed.

SUMMARY

Described are compositions and methods relating to coated granules comprising a core coated with a cross-linkable polymer. The cross-linkable polymer is provided in a feed suspension that includes an acid neutralized with a volatile base and a calcium salt that is insoluble at the pH of the neutralized feed suspension. Volatilization of the base in a coating apparatus decreases the pH of the feed suspension, thereby solubilizing the calcium salt, and inducing in situ, calcium ion-mediated cross-linking of the cross-linkable polymer. The granules further include one or more benefit agents, which are typically small molecules or macromolecules.

Aspects and embodiments of the compositions and methods are described in the following, independently-numbered, paragraphs.

1. In one aspect, a method for applying cross-linked coatings comprising a benefit agent onto cores is provided, comprising: providing a feed suspension comprising a cross-linkable polymer, an acid neutralized with a volatile base, and a calcium salt insoluble at the pH of the neutralized feed suspension; and atomizing the feed suspension so as to contact, deposit and coat the atomized feed suspension onto the cores, within a coating apparatus; wherein upon atomization and contacting of the feed suspension with the cores, volatilization of the volatile base lowers the pH of the feed suspension, solubilizing the calcium salt and enabling ion-mediated cross-linking of the cross-linkable polymer on the cores 2. In some embodiments of the method of paragraph 1, the coating apparatus is a fluidized bed spray-coater.

3. In some embodiments of the method of paragraph 1 or 2, the feed suspension is atomized and delivered at a nozzle pressure of 1-4 bar.

4. In some embodiments of the method of any of the preceding paragraphs, the amount of cross-linkable polymer in the feed suspension is at least about 1.5%, at least about 2.0% or at least about 2.5%.

5. In some embodiments of the method of any of the preceding paragraphs, the amount of cross-linkable polymer in the feed suspension is between about 1.5% and 3.0%.

6. In some embodiments of the method of any of the preceding paragraphs, the amount of cross-linkable polymer in the coating is at least about 8% and less than about 20%.

7. In some embodiments of the method of any of the preceding paragraphs, the feed suspension further comprises a hydrophobic compound.

8. In some embodiments of the method of any of paragraphs 1-6, the cross-linkable polymer is selected from the group consisting of alginate, carrageenan, pectin, agar, starch, xanthan gum, guar gum, gum arabic, glactomannans, and proteins such as gelatin, collagen, casein, zein, soy protein, whey protein, potato protein, album, or derivatives thereof; and synthetic polymers such as carboxymethyl cellulose, polyaspartic acid, polyglutamic acid, polyacrylic acid, polymethacrylic acid, and copolymers thereof.

9. In some embodiments of the method of any of paragraphs 1-6, the cross-linkable polymer is alginate, or a derivative, thereof.

10. In some embodiments of the method of any of the preceding paragraphs, the calcium salt is selected from the group consisting of dicalcium phosphate, calcium carbonate, calcium oxalate, calcium phosphate, calcium meta-silicate, calcium tartrate and combinations, thereof.

11. In some embodiments of the method of any of the preceding paragraphs, the acid is an organic acid selected from the group consisting of adipic acid, acrylic acid, glutaric acid, succinic acid, ascorbic acid, gallic acid, caffeic acid and combinations, thereof.

12. In some embodiments of the method of any of the preceding paragraphs, the volatile base is selected from the group consisting of ammonia, methylamine, trimethylamine, ethylamine, diethylamine, and trimethylamine and combinations, thereof.

13. In some embodiments of the method of any of the preceding paragraphs, the cores comprise a material selected from the group consisting of sodium sulfate or other inorganic salts, sucrose or other sugars or sugar alcohols, clay or other minerals or combinations, thereof.

14. In some embodiments, the method of any of the preceding paragraphs further comprises applying an additional coating layer over the cross-linkable polymer-containing coating layer on the granular core material.

15. In some embodiments of the method of paragraph 14, the additional coating comprises polyvinyl alcohol.

16. In some embodiments of the method of any of the preceding paragraphs, the feed suspension further comprises a benefit agent.

17. In some embodiments of the method of paragraph 16, the benefit agent is a protein.

18. In some embodiments of the method of paragraph 16, the benefit agent is an enzyme.

19. In some embodiments of the method of paragraph 16, the benefit agent is a microorganism.

20. In some embodiments of the method of paragraph 16, the benefit agent is small molecule.

21. In some embodiments of the method of any of the preceding paragraphs, the cores comprise a benefit agent.

22. In some embodiments of the method of any of the preceding paragraphs, the cores do not comprise a benefit agent.

23. In some embodiments of the method of any of the preceding paragraphs, the cross-linkable polymer is selected from the group consisting of alginate, pectin, agar, starch, xanthan gum, guar gum, gum arabic, glactomannans, and proteins such as gelatin collagen, casein, zein, soy protein, whey protein, potato protein, album, or derivatives thereof and synthetic polymers such as carboxymethyl cellulose, polyaspartic acid, polyglutamic acid, polyacrylic acid, polymethacrylic acid, and copolymers thereof.

24. In some embodiments of the method of any of the preceding paragraphs, the cross-linkable polymer is alginate, or a derivative, thereof.

25. In another aspect, particles produced by the method of any of the previous paragraphs are provided.

26. In another aspect, a layered fluid-bed spray-coated granule comprising a core coated with a layer of cross-linkable polymer is provided.

27. In some embodiments of the granule of paragraph 26, the amount of cross-linkable polymer in the layer of cross-linkable polymer is at least about 0.5%, at least about 1.0%, at least about 1.5%, at least about 2.0% or even at least about 2.5%.

28. In some embodiments of the granule of paragraph 26 or 27, the layer of cross-linkable polymer further comprises a copolymer.

29. In some embodiments of the granule of any of paragraphs 26-28, the layer of cross-linkable polymer further comprises a hydrophobic compound.

30. In some embodiments of the granule of any of paragraphs 26-29, the cores comprise sodium sulfate or other inorganic salts, sucrose or other sugars or sugar alcohols, clay or other minerals or combinations, thereof.

31. In some embodiments of the granule of any of paragraphs 26-29, the cores comprise sodium sulfate.

32. In some embodiments, the granule of any of paragraphs 26-29 further comprises an additional coating over the core coated with a layer of cross-linkable polymer.

33. In some embodiments of the granule of paragraph 32, the additional coating comprises polyvinyl alcohol.

34. In some embodiments, the granule of any of paragraphs 26-33 further comprises a benefit agent.

35. In some embodiments of the granule of paragraph 34, the benefit agent is a protein.

36. In some embodiments of the granule of paragraph 34, the benefit agent is an enzyme.

37. In some embodiments of the granule of paragraph 34, the benefit agent is an microorganism.

38. In some embodiments of the granule of paragraph 34, the benefit agent is a small molecule.

39. In some embodiments of the granule of any of paragraphs 26-38, the core comprises a benefit agent.

40. In some embodiments of the granule of any of paragraphs 26-38, the core does not comprise a benefit agent.

41. In some embodiments of the granule of any of paragraphs 26-38, the cross-linkable polymer is alginate, carrageenan, collagen, soy protein or whey protein, or derivatives thereof.

42. In some embodiments of the granule of any of paragraphs 10-34, the cross-linkable polymer is selected from the group consisting of alginate, carrageenan, pectin, agar, starch, xanthan gum, guar gum, gum arabic, glactomannans, and proteins such as gelatin, collagen, casein, zein, soy protein, whey protein, potato protein, album, or derivatives thereof and synthetic polymers such as carboxymethyl cellulose, polyaspartic acid, polyglutamic acid, polyacrylic acid, polymethacrylic acid, and copolymers thereof.

These and other aspects and embodiments of present modified cells and methods will be apparent from the description, including any accompanying Drawings/Figures.

DETAILED DESCRIPTION

I. Definitions and Abbreviations

Figure 1:
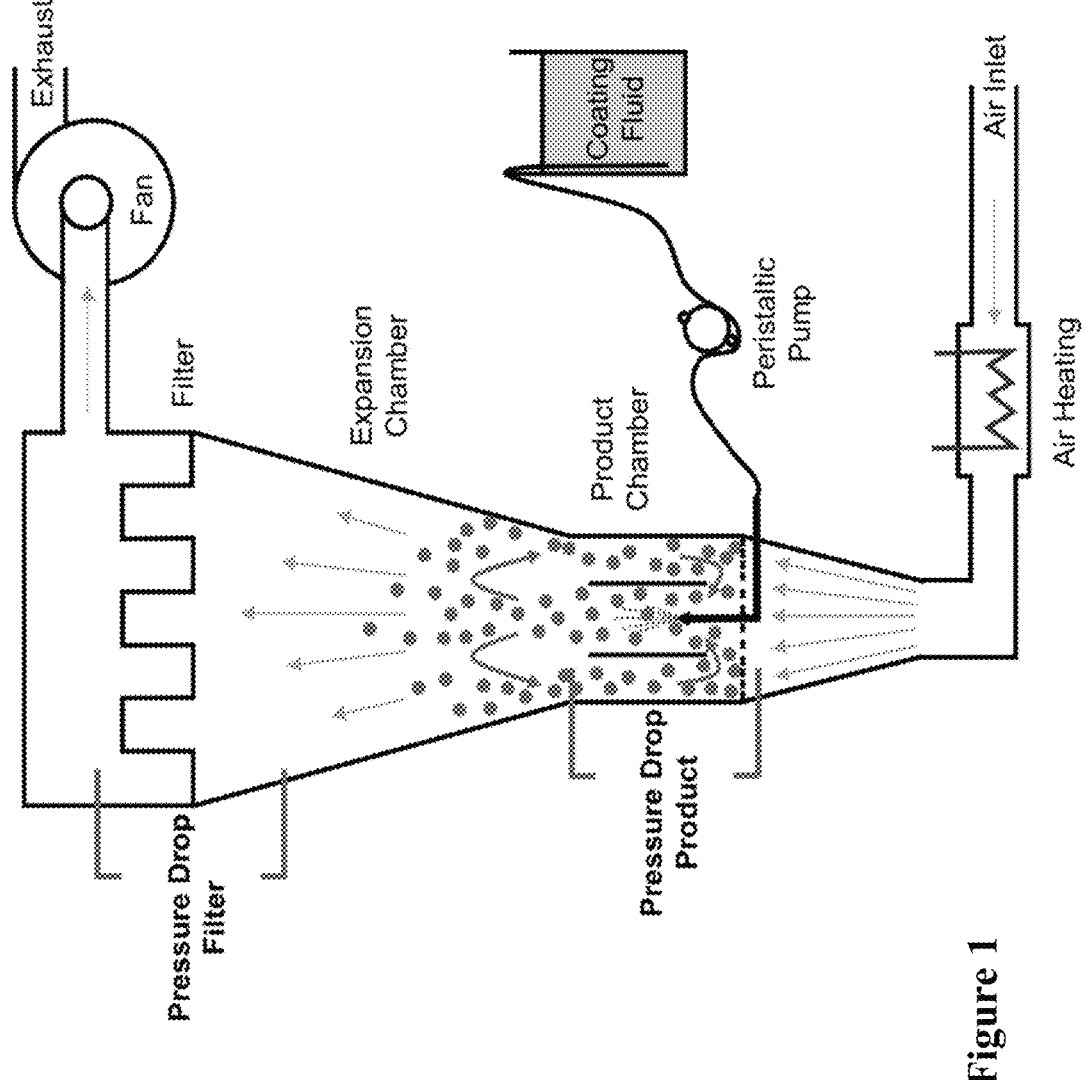
FIG. 1 is a diagram showing a fluidized bed spray-coater in Wurster configuration.

Prior to describing the present compositions and methods in detail, the following terms are defined for clarity. Terms not defined should be accorded their ordinary meanings as used in the relevant art.

As used herein, "cross-linkable polymer" refers to a natural or synthetic polymer with cross-linkable anionic groups or side chains, such as carboxylate, sulfate and/or phosphate groups.

As used herein, "ion-mediated cross-linking" or simply "cross-linking" refers to non-covalent bridging of anionic groups on monomer or polymer molecules by means of soluble divalent cations.

As used herein, to "coat" or to "apply a coating" is to spray or otherwise contact a liquid solution or suspension so as to deposit an integral layer of dried or congealed solids onto a core or other substrate. Coating from solutions or suspensions involves evaporation of water or other solvents. Coating from a melt involves solidification of a molten liquid into a solid.

As used herein, a "granular core material" or simply "core" is a particle to which a coating can be applied in a fluidized bed spray-coater or other suitable coating apparatus.

As used herein, a "volatile base" is a strong chemical base that readily and substantially evaporates from aqueous solution or partitions to the vapor phase at a temperature below about 100° C.

As used herein, "cargo" is defined as an active agent or benefit agent, together with associated impurities or additives. For example, a fermentation broth suspension cargo can comprise an active enzyme plus other fermentation broth impurities such as other proteins, peptides, amino acids, polysaccharides, sugars, lipids, organic and inorganic acids As used herein, "alginate premix" is defined as alginate and associated ingredients incorporated to enable in-situ cross-linking during the spray-coating process, including the volatile base, suspended calcium salt and carboxylic acid, but not the cargo.

As used herein, "coating feed," "feed suspension" or simply "feed," is defined as a solution or suspension comprising a combination of the cargo and alginate premix, to be coated onto cores.

As used herein, "suspension" is defined as an aqueous mixture comprising water-soluble compounds and/or insoluble solids suspended in water. In the invention, a feed suspension is prepared that comprises both cargo and alginate premix.

As used herein, "suspension solids" or simply "solids" refers to the gravimetric amount (g) or percentage (% w/w) of all soluble and insoluble solids in an aqueous suspension as determined by infrared oven or microwave moisture balance operated without overheating, as per ASTM Standard Test Method for Determination of Total Solids in Biomass, Method E1756-01, or a comparable method. This also corresponds to the solids mass that would be deposited on a fluid bed coated granule, as a percentage of the original mass of the feed suspension, after coating and drying.

As used herein, "nozzle pressure" refers to the atomization pressure setting (in bar) of a two-fluid nozzle used in spraying feed onto cores in a fluidized bed spray-coater.

As used herein, "agglomerates" refers to clusters of coherently attached coated particles, comprising multiple single cores bonded via coating material. The amount of agglomerates in a sample can be quantified via sieving to determine the percentage of material larger than the maximum diameter of coated single particles, or by equivalent methods such as image analysis.

As used herein, "spray rate" refers to the liquid pump rate (in g/min) of a feed suspension being sprayed in a fluidized bed spray-coater.

As used herein, "fines" refers to particle of dried coating feed suspension that spray-dried or detached from core particles in a fluidized bed spray-coater. Fines typically accumulate in the filters at the exit of a fluidized bed, on the vessel walls or spray wands, or are otherwise dislodged from cores with mechanically robust and integral coatings.

As used herein, "coating efficiency" refers to the yield, as a percent of feed solids in a coating feed suspension that are retained in the coating layer of coated particles in a fluidized bed spray-coater process.

As used herein, "coating integrity" refers to the ability of a coating to retain undissolved core after a given dissolution time, relative to an equivalent uncoated core. It can be measured by analyzing the amount of core material solubilized, either directly or by a surrogate measure such as conductivity, for ionic solids. Coating integrity ranges from 0% (no retention relative to uncoated cores) to 100% (full retention with no core dissolution). Supplemental evidence for coating integrity can be provided by examination of scanning electron micrographs (SEMs) of coatings on coated cores.

As used herein, "particle size" refers to the mean diameter of a population of particles, as measured by sieve analysis, or a correlated technique such as laser light scattering or image analysis.

As used herein, "filter pressure drop" or simply "filter pressure" refers to the pressure drop (in kPa) across the exit filter or internal shaking filter in a fluidized bed spray-coater.

As used herein, "Heubach dust" refers to dust generated by the Heubach Dust Meter Type III (Heubach DUSTMETER GmbH, Salzburg, Austria). The Heubach test subjects particles to defined crushing and fluidization forces by using rotating paddles to roll steel balls through a bed of granules contained within a cylindrical chamber and simultaneously percolating a stream of air through the bed to strip off any dust that is generated. The generated dust is drawn by vacuum through a tube and deposited onto a filter pad outside the Heubach chamber. The weight or active component of the dust collected is referred to as Heubach dust.

As used herein, the singular articles "a," "an" and "the" encompass the plural referents unless the context clearly dictates otherwise. All references cited herein are hereby incorporated by reference in their entirety. The following abbreviations/acronyms have the following meanings unless otherwise specified:

° C. degrees centigrade
A alginate, % w/w
Å Angstrom
$A_C$ cross-linked alginate, % w/w
$A_N$ non-cross-linked alginate, % w/w
ASABE American Society of Agricultural and Biological Engineers
$A^X$ alginate, added at X % w/w concentration in the feed suspension
CLAM cross-linked alginate matrix
CLAMshell cross-linked alginate matrix, or matrix of other cross-linkable polymer, coated onto a core
$d_{gw}$ weighted mean diameter
E enzyme
F total solids in feed suspension (both soluble and insoluble)
g gram
hr hour
I coating integrity
kPa kiloPascal
kV kilovolt
L liter
M non-fat dry milk powder, also designated as "milk powder"
mg milligram
min minute
mL milliliter
mm millimeter
mM millimolar
n number
P PVA
–pX nozzle pressure (in bar) set to X
    (appended to distinguish repeat formulations run at different conditions)
PVA polyvinyl alcohol
rpm revolutions per minute
–sX spray rate (in grams per minute) set to X
    (appended to distinguish repeat formulations run at different conditions)
sec second
SEM scanning electron microscopy
% w/w percent weight/weight, also designated simply by % except where defined otherwise
Y spray yield, also called coating efficiency
μm micrometer, synonymous with "micron"

II. Overview of CLAMshell Coated Particles

Previous work described by several of the present inventors described a one-step spray-drying method for producing cross-linked alginate matrix microcapsules (U.S. Pat. No. 9,700,519). In the described cross-linked alginate matrix process, herein and elsewhere designated the CLAM process, cross-linking is prevented in the feed solution incorporating sodium alginate by maintaining a pH higher than approximately 5-6 using a volatile base to limit the solubility of a suspended calcium salt required for ion-mediated cross-linking. Atomization of the feed solution into an air stream, such as by spray-drying, causes volatilization of the base, thereby reducing the pH in the droplets and solubilizing the calcium salt. The soluble free calcium ions become available to cross-link the alginate polymer, inducing in-situ gelation of the alginate.

The CLAM process can be used to gel other cross-linkable polymers, that is to say natural or synthetic polymers with cross-linkable anionic groups or side chains, such as carboxylate, sulfate, and phosphate groups. Cross-linkable polymers include polysaccharides such as carrageenan, pectin, agar, starch, xanthan gum, guar gum, gum arabic, glactomannans, and proteins such as gelatin, collagen, casein, zein, soy protein, whey protein, potato protein, album, or derivatives thereof; and synthetic polymers such as carboxymethyl cellulose (CMC), polyaspartic acid, polyglutamic acid, polyacrylic acid, polymethacrylic acid, and copolymers thereof, and the like, using any salt of calcium, magnesium or other divalent cation that is sparingly soluble at preselected titrated pH. A cargo thereby becomes incorporated within the cross-linked alginate matrix, producing encapsulated cargo as a flowable, dry powder. The CLAM spray-drying process has been used to simultaneously form, cross-link, and dehydrate alginate microcapsules in order to stabilize a variety of benefit agents as cargo, such as enzymes, polysaccharides, lipids, small molecules, and microorganisms.

Until now, there has been no suggestion or demonstration that the single-step CLAM encapsulation process, developed for spray-drying of aqueous suspensions to form particles with a unitary matrix structure, could be adapted to encapsulate and deposit an enzyme or other benefit agent within a coating layer on a core, using a coating process such as fluidized bed spray-coating. The present compositions and methods relate to a process for applying cross-linked coatings onto cores, comprising: providing a feed suspension comprising cross-linkable polymer, an acid neutralized with a volatile base, and a calcium salt insoluble at the pH of the neutralized feed suspension; suspending core particles within the air stream of a fluidized bed spray-coater, and atomizing the feed suspension so as to contact and coat the atomized feed suspension onto the cores within the coating apparatus; wherein upon atomization and contacting of the feed suspension with the cores, volatilization of the volatile base lowers the pH of the feed suspension, thereby solubilizing the calcium salt, and inducing ion-mediated cross-linking of the cross-linkable polymer on the granular core material.

The compositions are referred to as CLAMshells or CLAMshell particles and the methods are referred to as the CLAMshell process, since they adapt the aforementioned CLAM process for alginate cross-linking in a spray-drying process to a fluidized bed spray-coating process for applying an encapsulated layer (i.e., shell) of enzyme or other benefit agent over a core to create a core-shell structure, with the CLAM component in the shell or layer. The term CLAM-shell is not meant to be limiting to compositions incorporating alginate as the cross-linkable polymer, but can apply to compositions incorporating any cross-linkable polymer, such as carrageenan, collagen, soy protein or whey protein, or derivatives, thereof.

The CLAMshell process maximizes the rate at which an enzyme-containing suspension is coated onto a core particle using a fluidized bed coater while minimizing the generation of agglomerates and fines, and produces strong, uniform, and mechanically resistant particles of cross-linked coatings embedded with enzyme, coated onto cores.

The CLAMshell process can be applied to encapsulation of a broad range of benefit agents, including biological actives such as enzymes and other proteins, microorganisms, small molecules useful as pharmaceutical actives, agricultural actives, food or feed ingredients, personal care, cosmetics, flavors and fragrances. A particular use is the encapsulation of enzymes and other proteins.

III. Preferred Process Conditions and Characteristics of CLAMshell Coated Particles The compositions and methods were developed using several exemplary granule formulations using sodium sulfate crystals as core particles, first using milk powder as an inactive surrogate for enzyme as cargo and subsequently with a commercially relevant enzyme, subtilisin protease.

Characterization of the described coated particles included measurement of agglomerates and fines, measurement of coating efficiency and coating strength, particle size, and examination of surface morphology by scanning electron microscopy.

The overall conclusion to be derived from the incorporated Examples and Figures, is that, in fluidized bed spray-coating of enzymes, proteins or other benefit agents onto cores, incorporation of alginate (or other cross-linkable polymer), insoluble calcium salt, and volatile base into the feed slurry containing the benefit agent, induces in situ cross-linking of the cross-linkable polymer, and thereby enables achievement of high spray rates, high coating efficiency, reduced fines generation, and reduced filter fouling, resulting in a coated particle with reduced evidence of surface cracking or coating damage, and exhibiting low Heubach dust.

To achieve the objects of the invention, cross-linkable alginate is incorporated into a coating layer in an amount of at least about 0.5%, at least about 1.0%, at least about 1.5%, at least about 2.0% or even at least about 2.5%, referring to the concentration of alginate in a feed suspension for introduction into a fluid bed coater. In some cases, cross-linkable alginate is incorporated into a coating layer in an amount not greater than about 3.0%, again referring to the concentration of alginate in a feed suspension for introduction into a fluid bed coating device. The resulting coated granules will preferably comprise alginate at a content of at least about 3%, at least about 5%, or preferably even at least about 8% cross-linked alginate as a percentage of total feed solids in the coating layer, and as high as about 20%, again referring to the concentration of alginate solids as a percent of total feed solids in the coating layer of the granule.

Preferred atomization conditions are about 1-4 bar, about 2-4 bar or even between about 2-3.5 bar nozzle pressure, which enables a fluid bed coating process with high spray rates, high coating efficiency (greater than about 85%), reduced fines generation (less than about 2%) and reduced filter fouling (no more than about 3 kPa). Process parameters, such as nozzle pressure, may depend to some extent on the physical properties of the enzyme or other cargo, and can be optimized as needed by the skilled person, as illustrated in the examples. The resulting coated particles ideally demonstrate high production quality product with low Heubach dust (less than about 10 mg/g), and a low degree of agglomeration (less than about 2%). The skilled person will also appreciate that the spray rates as illustrated in the examples using laboratory equipment can be increased as a function of the scale and configuration of the coating equipment, increased size or number of nozzles, increased fluidization air velocity, and the like, according to well-known principles and experience with scale-up of fluidization and coating processes.

A further advantage of in situ cross-linked alginate coatings is improved coating integrity resulting in delayed release of cargo (i.e., one or more active or benefit agents) from an alginate-containing coating and/or from cross-linked alginate-coated cores. Generally, higher levels of cross-linked alginate results in increased coating integrity. An indicator of coating integrity, used herein, is the percent of the coated core retained and hence not released in solution, relative to that of an uncoated core, after a given amount of dissolution time. This is illustrated in the Examples and Figures by measuring the conductivity increase due to solubilization of the sodium sulfate cores, which can be considered a proxy for the release of a cargo. A high coating integrity coating will retain at least 25% of the core undissolved after 20 seconds, relative to the conductivity of an uncoated core in the same dissolution apparatus. Comparable coatings without the cross-linked alginate typically show less than 25% of the conductivity released at 20 seconds by an uncoated sodium sulfate core.

IV. Materials for Use in CLAMshell Coated Particles

The organic acid for use in the present composition and methods is preferably adipic acid, acrylic acid, glutaric acid, succinic acid, ascorbic acid, gallic acid, caffeic acid or combinations, thereof. Other organic acids may provide comparable results.

The volatile base is preferably ammonia, methylamine, trimethylamine, ethylamine, diethylamine, and trimethylamine or combinations, thereof. Other volatile bases may provide comparable results.

The alginate can be any source of alginic acid or its sodium or potassium salt, derived from seaweed. Alginate can vary in molecular weight, viscosity and guluronic to mannuronic acid (G/M) ratio. Examples and sources include: sodium alginate from Millipore Sigma (Cat #A1112; LV), BASF (Grades: Hydagen 558P; 145), TIC (Algin 400), and DuPont (Grade: GRINDSTED® Alginate FD 155). Other suitable sources are described in U.S. Pat. No. 9,700,519B2, which also describes other suitable natural anionic polymers, as well as variations of multivalent cations, volatile bases etc.

Suitable cores for use in the present compositions and methods are preferably of a hydratable or porous material, i.e., a material which is dispersible or soluble in water. The core material should either disperse in water (disintegrate when hydrated) or truly solubilize in an aqueous solution.

Particles composed of soluble or insoluble inorganic salts and/or sugars and/or small organic molecules may be used as cores. Suitable water-soluble ingredients for incorporation into cores include: inorganic salts such as sodium chloride, ammonium sulfate, sodium sulfate, magnesium sulfate, zinc sulfate; or urea, citric acid; sugars such as sucrose, glucose, fructose or lactose; sugar alcohols such as sorbitol, or mannitol; saccharides such as maltodextrin; organic acids such as citric acid, succinic acid or lactic acid; and osmolytes such as urea and betaine, and the like.

Clays, for example, the phyllosilicates bentonite, kaolin, montmorillonite, hectorite, saponite, beidellite, attapulgite, and stevensite, silicates, such as sand (sodium silicate), nonpareils and agglomerated potato starch or flour, or other starch granule sources such as wheat and milled corn cobs are considered dispersible.

Nonpareils are spherical particles consisting of a seed crystal that has been built onto and rounded into a spherical shape by binding layers of powder and solute to the seed crystal in a rotating spherical container. Nonpareils are typically made from a combination of a sugar such as sucrose, and a powder such as cornstarch. In some embodiment of the present compositions and methods, the core is a sodium chloride or sodium sulfate crystal, sometimes referred to as a seed, or other inorganic salt crystal. In another embodiment of the present invention, the core is a sucrose crystal.

Cores may further comprise polymers, fillers, plasticizers, fibrous materials, extenders and other compounds known to be used in cores. Suitable polymers include polyvinyl alcohol (PVA), polyethylene glycol, polyethylene oxide, polyvinyl pyrrolidine, and carbohydrate polymers (such as starch, amylose, amylopectin, alpha and beta-glucans, pectin, glycogen), including mixtures and derivatives thereof.

Suitable fillers useful in the cores include inert materials used to add bulk and reduce cost or used for the purpose of adjusting the intended enzyme activity in the finished granule. Examples of such fillers include, but are not limited to, water soluble agents such as salts, sugars and water dispersible agents such as clays, talc, silicates, cellulose and starches, and cellulose and starch derivatives.

Suitable plasticizers useful in the cores of the present invention are low molecular weight organic compounds and are highly specific to the polymer being plasticized. Examples include, but are not limited to, sugars (such as, glucose, fructose and sucrose), sugar alcohols (such as, sorbitol, xylitol and maltitol and other glycols), polar low molecular weight organic compounds, such as urea, or other known plasticizers such as water or feed grade plasticizers.

Suitable fibrous materials useful in the cores of the present invention include, but are not limited to: cellulose, and cellulose derivatives such as HPMC (hydroxypropyl methylcellulose), CMC (carboxymethyl cellulose), HEC (hydroxyethyl cellulose).

Cores may or may not include cargo, also referred to as an active agent or benefit agent together with associated impurities or additives. In the latter case, the cores are referred to as inert. The active agent may be a small molecule, a macromolecule or an organism, or any combination thereof. Cargo are discussed in greater detail, below.

A protective coating containing cross-linked alginate, otherwise known as a cross-linked alginate matrix coating or shell, is an integral part of the present composition and methods. However, the cross-linked alginate matrix coating, and any additional coatings, may include further components. Suitable protective coating components are polymers, carbohydrates, proteins, lipids, fats and oils, fatty acids, inorganic salts, and gums and mixtures thereof.

Protective coatings may include moisture barrier and moisture hydrating components. The moisture barrier components function by excluding moisture, for instance by forming a coating layer that does not absorb moisture and prevents or retards the rate of moisture migration into the core. Moisture hydrating components absorb or bind moisture as either free water or water of hydration, thereby acting to impede or retard the extent or rate of transport of external moisture into the core. The moisture hydrating components may thermally insulate the cargo and will absorb a certain amount of moisture and retain it within the hydrating material without allowing it to pass through into the core.

Moisture barrier components typically include hydrophobic materials, such as hydrophobic polymers, for example PVA (exemplified, herein), HPMC, acid-thinned hydroxypropyl starches and oxidized starch; proteins, for example whey and whey protein concentrates; lipids, for example, lecithin; fats and oils, fatty acids, latex and gums, for example, gum arabic. Certain moisture barrier components, such as PVA and gum arabic, are not readily oxidized and find particular applicability in providing chemical stability, for example when the granules of the invention are stored in unpelleted or untableted animal feed mixtures, particularly in premixes that contain choline chloride. Moisture hydrating coating materials typically are hydrophilic materials, such as carbohydrates and inorganic salts, including hydrated salts. Examples of moisture hydrating components are magnesium sulfate, sodium sulfate, maltodextrin, ammonium sulfate, sugars, for example, sucrose, and native cornstarch.

Polymers used in protective coatings include polyvinyl alcohol (PVA), polyethylene glycol (PEG), polyvinylpyrrolidone (PVP), polyacrylates, polyethylene oxides (PEO), polylactic acid, polyvinyl chloride, polyvinyl acetate, cellulose ethers, alginates, gelatin, modified starches and substituted derivatives, hydrolysates and copolymers thereof, such as acid-thinned hydroxypropyl starch, such as, PURE COTE™, hydroxypropyl methylcellulose (HPMC), methylcellulose (MC), carboxymethyl cellulose (CMC), and ethylcellulose (EC). The most preferred polymers for the protective coatings are PVA, modified PVA, as described in U.S. Pat. No. 6,872,696, and modified cellulose, such as methylcellulose and hydroxylpropylmethyl cellulose, as described in WO 99/51210, both of which are incorporated by reference herein.

Carbohydrates used in protective coatings include maltodextrin, hydroxymethyl cellulose, modified or native starches made from corn, sorghum, arrowroot, rice, wheat, rye, barley, oat, potato, yam, tapioca, cassava, sago, and sugars including sucrose, corn syrup solids, molasses, glucose, fructose, and lactose.

Proteins used in protective coatings include whey powder, whey protein concentrate, whey protein isolate, caseinates, soy protein concentrate and isolate, zein, albumin and gelatin.

Simple, compound and derived lipids that may be used in the protective coatings are waxes (for example, vegetable, mineral and synthetic, such as carnauba, candelilla, beeswax, cerumen, shellac, paraffin, and microcrystalline waxes); lecithin (for example mono- and diglycerides); fatty acids (for example stearic, palmitic, linoleic, oleic, butyric, and arachidonic fatty acids and their salts of sodium, potassium, calcium and zinc); and fats and oils (for example, hydrogenated or partially hydrogenated fats and oils, such as soy, corn, cottonseed, tallow, canola, and linseed oil). A preferred lipid for the protective coatings is lecithin.

Inorganic salts used for the protective coatings include salts of sulfate, citrate, chloride, carbonate, sulfite, phosphate, phosphonate, and bicarbonate salts of sodium, ammonium, potassium, calcium, magnesium and zinc. Preferred salts are magnesium, sodium and ammonium sulfates.

Gums that may be used in the protective coatings include gum arabic, guar gum, agar, gum tragacanth, karaya gum, locust bean gum, carrageenan, xanthan gum, and alginates.

The protective coatings of the present invention further may include plasticizers, lubricants, pigments and powders, such as talc, bentonite, kaolin, cornstarch, magnesium silicate, calcium carbonate, and chitosan.

V. Cargo Suitable for Delivery Using CLAMshell Coated Particles

Cargo (also referred to as one or more active or benefit agents), together with associated impurities or additives, may be present in the cores of CLAMshell particles, in the cross-linked alginate-containing matrix coating, in additional coatings and/or combinations, therefore. Cargo may also expressly not be present in the cores of CLAMshell particles, in the cross-linked alginate matrix coating, in additional coatings and/or combinations, therefore. Cores or layers that do not include cargo are referred to as inert, even though they may otherwise include important features of the present compositions and methods. Generally, cargo is included in at least one of the layers of the present particles, and optionally also in the core, as the purpose of the present compositions and methods is to safely and efficiently deliver a cargo.

The cargo may be a small molecule. A small molecule is a compound with a molecular weight less than about 1000 Daltons, such as an amino acid, peptide, sugar, lipid, vitamin, or hormone, or a volatile compound such as an alcohol, an aldehyde, a ketone, an ester, an acetate, a nitrile, a terpene, a terpenoid, a nitrogenous or *sulphurous* heterocyclic compound, or an essential oil of natural or synthetic origin.

The cargo may be a macromolecule. A macromolecule is a compound with a molecular weight greater than about 1000 Daltons, typically a polymer, such as an enzyme or other protein, a polysaccharide, or a synthetic polymer.

Enzymes include phytases, xylanases, β-glucanases, phosphatases, proteases, amylases cellulases, lipases, cutinases, endoglycosidases, fucosidases, oxidases, transferases, reductases, hemicellulases, mannanases, esterases, isomerases, pectinases, lactases, peroxidases, laccases, other redox enzymes and mixtures, thereof. Any enzyme may be used with the present compositions and methods, including wild-type, recombinant and variant enzymes of bacterial, fungal, yeast, plant, insect and animal sources, and acid, neutral or alkaline enzymes.

The cargo may be a microorganism or other living organism.

Microorganisms include any bacteria, yeast, or fungi. Suitable bacteria include gram-positive or gram-negative bacteria, including but not limited to bacteria of the genus *Bacillus, Paenibacillus, Lactobacillus, Brevibacillus, Escherichia, Gluconobacter, Gluconacetobacter, Acetobacter, Streptococcus, Methylobacterium, Pantoea, Pseudomonas, Sphingomonas, Curtobacterium, Knoellia, Massilla, Pedobacter, Skermanella, Clostridia, Klebsiella, Spirillum, Streptomyces, Coniothyrium, Clonostachys,* or *Achromobacter.* Suitable yeast include, but are not limited to, yeast of the genus *Saccharomyces,* Hanseniaspora. Suitable fungi include, but are not limited to, fungi of the genus *Trichoderma, Aspergillus, Aureobasidium, Ulocladium, Muscodor, Metarhizium, Beauveria, Paecilomyces, Isaria,* or *Lecanicillium.*

The cargo may be a food or feed ingredient, an antimicrobial agent, an antibiotic replacement agent, a prebiotic, a probiotic, an agrochemical ingredient, such as a pesticide, fertilizer, herbicide or biostimulant; a pharmaceutical ingredient, a cosmetic or personal care compound, a perfume or fragrance, a flavor, a bleach, bleach activator or other cleaning compound, or combinations, thereof.

In general, any cargo that has been carried in conventional matrix particles and/or coated particles can be carried by the present particles.

VI. Coating Processes and Equipment Suitable for Producing CLAMshell Particles In general, any coating process or equipment can be used to coat the cross-linkable polymer matrix comprising the benefit agent onto cores to form a granular CLAMshell particle.

The coating process can be a fluidized bed spray-coating process, carried out by introducing and suspending cores in a fluidized air stream and spraying an atomized coating feed solution or suspension comprising a benefit agent and cross-linkable polymer so as to contact and deposit successive layers of dried material onto the cores upon evaporation of the water or other solvent from the coating feed, thereby building up a continuous coating or "shell." The cores may be inert particles devoid of a benefit agent, or may alternatively comprise one or more benefit agents.

Fluidized bed spray-coating processes can be carried using different fluidized bed spray-coater coater equipment configurations, including top-spray fluidized bed, bottom-spray (e.g., Wurster mode) fluidized bed, and spray-agglomeration, in which the coated cores are further built up by recirculation and bridging to form larger clusters or agglomerates, whereby the coating solution dries to create particles that comprise multiple cores bridged by dried coating solution. These fluidized bed processes can be operated in batch mode wherein all the cores are introduced into the fluidized bed at one time, or in continuous mode, wherein new core material is added and withdrawn continuously or periodically.

Fluidized bed spray-coating can also be carried out via spray-granulation, wherein granules are built up without the use of an initial charge of inert cores, but rather where the cores are formed out of feed suspension itself. In spray-granulation, the feed solution or suspension is first sprayed into an empty chamber to form dry nuclei directly from the feed, then progressively built up in consecutive coating layers from the feed, to form an onion-like structure in which the entire granule consists of dried feed material, and hence the core and shell have the same or similar compositions. Unlike a spray-dried particle, which is dried from feed in a one-pass or "single effect" drying process, a spray-granulated particle is built up by successive coating additions representing "multiple effect" drying and coating steps. Spray-granulation can be carried out in spouted bed granulators, such as the Glatt AGT fluid bed granulator, or the Glatt ProCell spouted bed continuous granulator.

The coating process can be carried out in a mechanical coater, via a mixing or agitation process, in which core particles are coated by spraying or otherwise distributing and contacting a coating solution onto cores undergoing vigorous agitation by various means, such as tumbling or rotation on a friction plate, to enable deposition, spreading and drying of the coating. Mechanical coaters include mixing and agitation processes that can be carried out using different equipment configurations, such as drum granulators, mixer-granulators, ribbon blenders, V-blenders, twin-shell blenders, conical blenders, Nauta mixers and other conical screw mixers, high-shear granulators, spheronizers, roto granulators, and the like.

EXAMPLES

The following examples are intended to illustrate but not limit the present compositions and methods.

Example 1. Methods

A. Source of Reagents

Low viscosity alginate (A1112), periodic acid, Schiff's fuchsin sulfite, and sodium metabisulfite were purchased from Millipore-Sigma (Burlington, MA). Ammonium hydroxide, sodium citrate dihydrate, and succinic acid were purchased from Fisher (Waltham, MA). Sodium sulfate (anhydrous) cores were purchased from Minera de Santa Marta (Belorado, Spain). Calcium hydrogen phosphate was purchased from Frontier Scientific (Logan, UT). Nonfat dry milk powder was purchased from a local market. Milli-Q water was used for the entire study. Enzyme fermentation broth and polyvinyl alcohol (Mowiol 5-88) were supplied by DuPont (Wilmington, DE).

B. Process for Applying Coatings

Core particles were sodium sulfate crystals of 200-300 μm mean diameter. Cores were loaded into the product chamber of a 2 L capacity fluidized bed coater (model: Uniglatt, Glatt GmbH, Weimar, Germany) in Wurster configuration, and coated with cargo feed suspensions as described in the Examples.

C. Characterization of Spray-Coated Products

Sieving analyses were completed using a 20 g sample size of coated particles (n=3), loaded onto the largest size sieve in a series (500, 354, 300, 250, 212, and 150 μm) and placed into a Sonic Sifter L3P (Allen-Bradley, Milwaukee, WI). Sift amplitude was set to 7 and pulse amplitude was set to 8. The sieving duration was 5 minutes. After sieving, the mass of particles on each screen was measured using an analytical balance. Size distributions generated from sieving were used to estimate the weighted mean diameters ($d_{gw}$) of coated particles following ASABE standards [35]. Fines were defined as material passing through the 150 μm sieve, and agglomerates were defined as material retained by the 500 μm sieve.

Coating efficiency, alternatively termed spray yield (Y), was calculated using equation (1), $$Y = \frac{\text{coated solids}}{\text{total sprayed solids}} = \frac{P(1 - MC) - F - C}{TS} \qquad (1)$$

where P=total product collected (g), MC=wet basis moisture content (%), F=total fines in product (g), C=initial cores amount (g), and TS=total solids sprayed (g).

Coating morphology was investigated by scanning electron microscopy (SEM) using a Thermo Scientific Quattro ESEM. Samples were embedded in epoxy resin and sectioned with a microtome using a glass, then diamond blade. Surface and sectioned samples were mounted onto carbon tape and sputter-coated in gold to a target thickness of 120 Å. A beam voltage of 5 or 10 kV and spot size of 3.0 were selected.

Coating strength was determined by the generation of dust from the coated product using a Heubach Dustmeter Type III (Heubach DUSTMETER GmbH, Salzburg, Austria). Samples were sieved to between 300 and 500 μm (n=3) and loaded volumetrically to 16.25 ml fill volume, based on bulk density into the grinding chamber. The program was set to run at 45 rpm for 20 minutes. Airflow was 20 L/min. Accumulated dust was weighed.

Coating integrity (I) is defined as the ability of a coating to retain undissolved core after a given dissolution time, relative to an equivalent uncoated core. It is calculated using equation (2), $$I = 1 - \frac{K_{i,20}}{K_{c,20}} \qquad (2)$$

where $K_{i,20}$=conductivity of a coated particle, i, at 20 seconds, and $K_{c,20}$=conductivity of an uncoated core sample at 20 seconds.

With a control sample of 5 g sodium sulfate cores, a mass of coated particles containing the same amount of sodium sulfate (5 g) was calculated based on the mass of collected product per mass of cores and was used as the sample mass (n=3). In a beaker containing 200 g of Milli-Q water stirring at 400 rpm, each sample was quickly added in, recording conductivity measurements every five seconds for one minute.

Moisture content (%) on a wet basis was measured gravimetrically. Approximately 3 g of coated particles (n=3) were placed in a drying oven between 60-70° C. over three days.

Water activity was measured in triplicate using an AquaLab Series 3TE water activity meter (METER, Pullman, WA).

Bulk density (g/mL) was calculated by weighing approximately 200 g of non-compacted coated particles (n=3) in a graduated cylinder and recording the corresponding volume.

Example 2. Formulation and Coating of Non-Fat Dry Milk Coating Suspensions, with and without Alginate or In-Situ Cross-Linking Prior to producing coated enzyme granules with in situ cross-linked alginate, non-fat dry milk powder (M) was used as a surrogate for the enzyme (E). Six coating suspensions containing non-fat dry milk were prepared: non-fat dry milk without alginate (M), non-fat dry milk plus the cross-linking alginate formulation ($MA_C$) at varying alginate concentrations, and non-fat dry milk plus the non-cross-linking alginate formulation ($MA_N$). Specific concentrations of alginate in the feed suspension, as X % w/w, are indicated by a superscript i.e. $A^X$. Coating suspensions were prepared to 2000 g. First, all carrier agents were combined into a 1000 g alginate premix suspension and mixed overnight to allow full hydration and dissolution of alginate. Prior to coating, 1000 g of 30% non-fat dry milk was prepared as a cargo suspension, and was added, bringing the coating feed suspension to its final mass of 2000 g. The coating feed suspension formulations are summarized in Table 1. All formulation included 15% non-fat dry milk as cargo. The amount of alginate, succinic acid, calcium hydrogen phosphate, and the base used to adjust the succinic acid solution to pH 7.0 are indicated.

TABLE 1

| Non-fat dry milk powder (M) coating feed suspension formulations | | | | | | | |
|---|---|---|---|---|---|---|---|
| Formu-lation | Milk Powder (%) | Algi-nate (A) (%) | Suc-cinic Acid (%) | Base | CaHPO₄ (%) | Feed Solids (F) (%) | A_C/F (%) |
| M | 15.0 | 0 | 0 | n/a | -0- | 15.0 | 0.0 |
| MA_N^2.0 | 15.0 | 2.0 | 1.0 | NaOH | 0.500 | 18.5 | 0.0 |
| MA_C^0.5 | 15.0 | 0.5 | 0.25 | NH₄OH | 0.125 | 15.75 | 3.2 |
| MA_C^1.0 | 15.0 | 1.0 | 0.50 | NH₄OH | 0.250 | 16.5 | 6.1 |
| MA_C^1.5 | 15.0 | 1.5 | 0.75 | NH₄OH | 0.375 | 17.25 | 8.6 |
| MA_C^2.0 | 15.0 | 2.0 | 1.0 | NH₄OH | 0.500 | 18.5 | 10.8 |

The M and MA$_C$ formulation feed suspensions were applied to 1500 g sodium sulfate cores (250-350 μm diameter) using a Glatt (Glatt GmbH, Weimar, Germany) Uniglatt laboratory fluidized bed coater in Wurster configuration (FIG. 1). The control parameters included inlet air temperature, airflow flap angle, nozzle pressure, nozzle position, and spray rate. The feed coating suspension spray rate was controlled by a peristaltic pump, calibrated prior to use.

The effect of alginate concentration and cross-linking was then examined at an inlet temperature of 55-60° C., nozzle pressure of 4 bar, nozzle position set to 0, airflow flap set to degrees, and spray rate of 14 g/min. For each batch, the following in-process parameters were monitored: outlet temperature, pressure-drop across the fluidized product, pressure-drop across the filter, and filter hits. In the Uniglatt coater, the outlet temperature is measured between the filter unit and the exhaust vent. The pressure-drop across the fluidized product is the difference between the pressure within the expansion chamber and the pressure below the product chamber. The pressure-drop across the filter compares the pressure above the filter at the outlet and the pressure within the expansion chamber. Both pressure-drops are displayed on gauges ranging from 0-5 kPa.

Over the course of a batch, the pressure-drop across the filter tended to increase due to accumulation of material on the product side of the filter. To reduce this accumulation, a manually-engaged filter shaking apparatus delivers a sharp mechanical tap to the filter housing. These "filter hits" were used only when the pressure-drop across the filter reached 5 kPa. Once initiated, the peristaltic pump and fluidizing air temporarily stop and a pneumatic pulse above the filter unit causes fines and particles trapped in the filter to fall into the product chamber. Each interruption consisted of five consecutive filter hits.

Nozzle pressure was varied to maximize the spray rate of two coating fluids while maintaining desirable process and product attributes (agglomerates <2% of product weight, filter fines <2%, filter pressure drop ≤3 kPa, coating efficiency >85%, coating integrity >25%).

Figure 2:
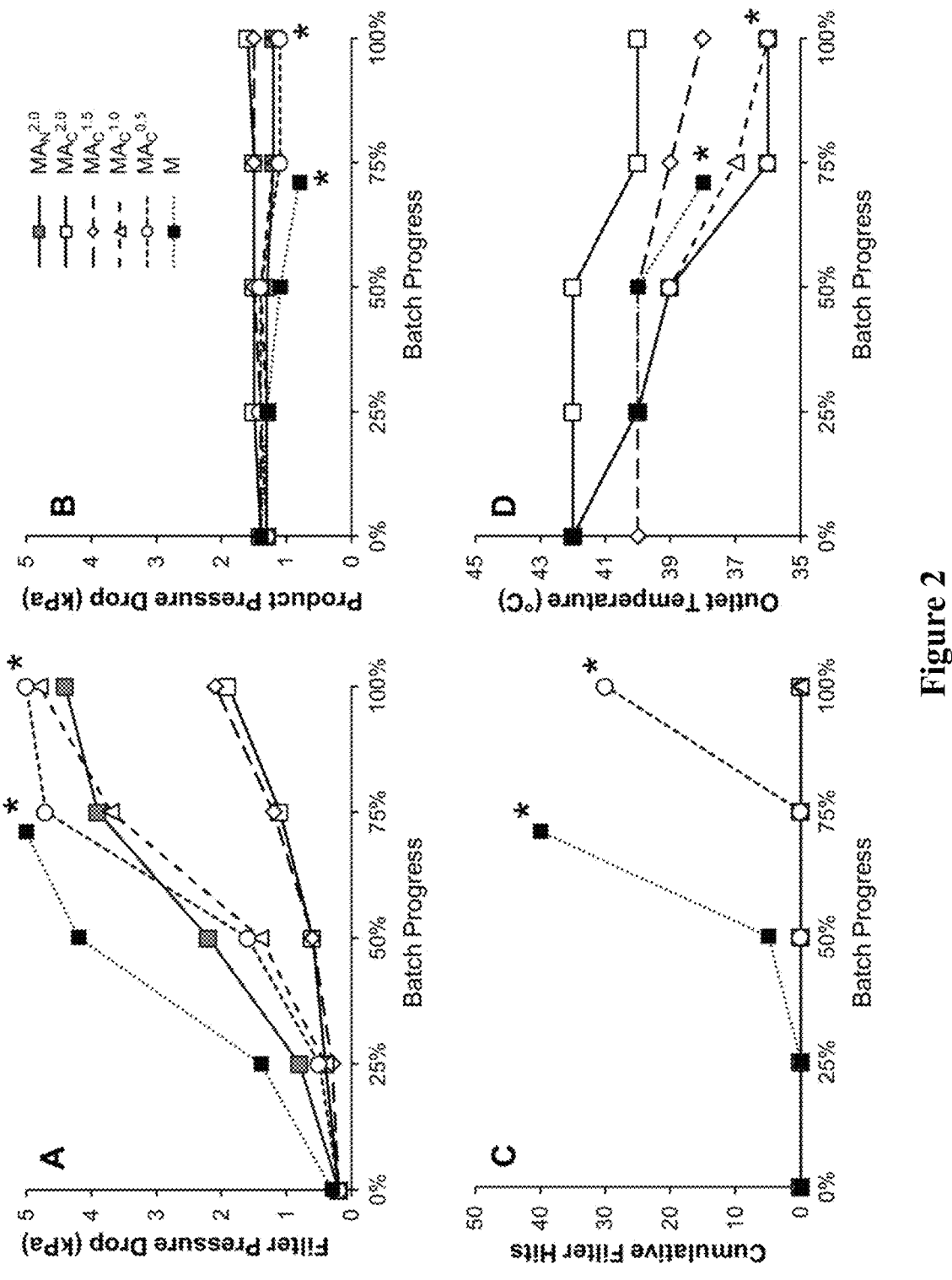
FIGS. 2A-2D show graphs summarizing indicators of dust generation during spray-coating of milk powder formulations $MA_N$ and $MA_C$ with alginate concentrations of 2%, 1.5%, 1%, 0.5% and 0%, at 14 g/min at 4 bar nozzle pressure. The parameters measured were filter pressure drop (2A), product pressure drop (2B), cumulative filter hits (2C), and outlet temperature (2D).

A preliminary set of coating runs were conducted at a nozzle pressure of 1.5 bar, for the milk powder without alginate (M) with and with 2% cross-linked alginate (MA$_C$^2.0). At these conditions, spray rate was increased until agglomerates increased to more than 2% w/w. A hyphenated suffix is appended to the runs designation where a given formulation was spray-coated under different process conditions, e.g. with variation in spray rate (–sX) in units of grams per minute, or nozzle atomization pressure (–pX) in units of bar. (For simplicity, the suffixes are omitted where these parameters are contextually understood to have a fixed value). As shown in Table 3 and FIGS. 2A and 2C, at 1.5 bar nozzle pressure, the milk powder coatings begin to agglom-erate significantly at a spray rate of 12 g/min, and filter fouling is also high, at above 4.5 kPa, with increased filter hits required to restore fluidization air. Addition of 2% w/w alginate to the feed suspension reduces the filter fouling to 1.4 kPa, but agglomeration becomes significant even at a spray rate of 8 g/min. The conclusion is that, for milk powder coatings, increased nozzle pressure is required. Note that unless otherwise specified, all % composition measurements are weight/weight (w/w).

In Tables 2 and 3, as in all subsequent tables that summarize the formulations, process parameters and results, process performance and product characteristics for various coating batch runs, boldface is used to indicate conditions, settings and results consistent with the present inventive concept, that fall within the desirable target ranges, as summarized in Tables 15 and 16. Batches that fully and simultaneously meet all individual performance targets have their designations (in the first column of each table) boldfaced. Non-bolded text indicates batches and individual measures that fall outside of the target ranges for conditions, settings or results.

TABLE 2

| Formulations and process parameters used for agglomeration of milk powder coatings | | | | |
|---|---|---|---|---|
| Batch | A_C (%) | A_C/F (%) | Nozzle Pressure (bar) | Spray Rate (g/min) |
| M-s6 | 0.0 | 0.0 | 1.5 | 6.0 |
| M-s8 | 0.0 | 0.0 | 1.5 | 8.0 |
| M-s10 | 0.0 | 0.0 | 1.5 | 10.0 |
| M-s12 | 0.0 | 0.0 | 1.5 | 12.0 |
| MA_C^2.0-s6 | 2.0 | 10.8 | 1.5 | 6.0 |
| MA_C^2.0-s8 | 2.0 | 10.8 | 1.5 | 8.0 |

TABLE 3

| Results of crosslinking milk powder coating runs in Table 2 | | | | | |
|---|---|---|---|---|---|
| Batch | Agglom-erates (%) | Fines (%) | Coating Efficiency (%) | Coating Integrity (%) | Filter Pressure Max (kPa) | Particle size (μm) |
| M-s6 | 0.52 | 0.03 | 88.10 | 5 | 3.3 | 332.60 |
| M-s8 | 0.84 | 0.05 | 89.10 | n/a | 4.6 | 345.70 |
| M-s10 | 1.39 | 0.07 | 85.60 | n/a | 5.0 | 351.10 |
| M-s12 | 5.42 | 0.22 | 85.90 | n/a | 5.0 | 346.40 |
| MA_C^2.0-s6 | 1.67 | 0.66 | 84.40 | 59 | 1.4 | 339.80 |
| MA_C^2.0-s8 | 7.71 | 0.22 | — | n/a | 1.7 | 361.40 |

To enable higher spray rates for milk powder coatings incorporating 2% cross-linked alginate (MA$_C$^2.0), a set of coating runs was carried out using higher nozzle pressures, as shown in Tables 4 and 5. In all these runs, the filter pressure drop remained below 1.9 kPa. At 1.5 bar nozzle pressure and a spray rate of 8 g/min, the agglomerates were unacceptably high (12.9%). Increasing nozzle pressure to 2.5 bar dropped the agglomerates to only 1.64%, while coating efficiency remained high and fines low. The best conditions were achieved at a nozzle pressure of 4.0 bar, which allowed a major increase in spray rate to 14 g/min, all while maintaining low agglomeration and fines and high coating efficiency. From this point forward, spray rates were set at 14 g/min.

TABLE 4

Formulations and process parameters to maximize spray rate
and minimize agglomeration for milk powder coatings

| Batch | Nozzle Pressure (bar) | Spray rate (g/min) |
|---|---|---|
| $MA_C^{2.0}$-s8-p1.5 | 1.5 | 8 |
| $MA_C^{2.0}$-s8-p2.5 | 2.5 | 8 |
| $MA_C^{2.0}$-s10-p2.5 | 2.5 | 10 |
| $MA_C^{2.0}$-s10-p3.0 | 3.0 | 10 |
| $MA_C^{2.0}$-s12-p3.5 | 3.5 | 12 |
| $MA_C^{2.0}$-s14-p4.0 | 4.0 | 14 |

TABLE 5

Results of crosslinking milk powder coating runs in Table 4

| Batch | Agglomerates (%) | Spray rate (g/min) | Fines (%) | Coating efficiency (%) | Particle size (µm) | Filter Pressure Max (kPa) |
|---|---|---|---|---|---|---|
| $MA_C^{2.0}$-s8-p1.5 | 12.90 | 8 | 0.03 | 91.1 | 374.7 | 0.4 |
| $MA_C^{2.0}$-s8-p2.5 | 1.64 | 8 | 0.05 | 92.8 | 345.7 | 0.8 |
| $MA_C^{2.0}$-s10-p2.5 | 7.45 | 10 | 0.07 | 94.4 | 359.7 | 0.6 |
| $MA_C^{2.0}$-s10-p3.0 | 2.55 | 10 | 0.22 | 93.4 | 346.9 | 1.5 |
| $MA_C^{2.0}$-s12-p3.5 | 0.66 | 12 | 0.66 | 91.8 | 337.3 | 1.8 |
| $MA_C^{2.0}$-s14-p4.0 | 1.68 | 14 | 0.22 | 94.2 | 354.0 | 1.9 |

Additional experiments were performed to determine how much alginate is required to achieve the challenging objective of simultaneously increasing spray rates, maintaining high coating efficiency, and minimizing the negative effects of excessive agglomeration, fines generation, and filter fouling. Tables 6 and 7 summarize a set of coating run batches in which alginate level was either absent (M), set at 2% without cross-linking ($MA_N^{2.0}$), or varied between 0.5% and 2.0%, with cross-linking ($MA_C^{0.5-2.0}$). Runs with either no alginate or 0.5% cross-linked alginate could not be completed, due to high agglomeration, high filter fouling and poor fluidization. Non-cross-linked alginate at 2% could be sprayed at 14 g/min at 4 bar nozzle pressure with minimal agglomeration and fines but filter fouling reached 4.4 kPa. The best results, at 14 g/min spray rate and 4 bar nozzle pressure, were achieved with cross-linked alginate ($A_C$) at 1.5% and 2.0% in the feed, corresponding to coating alginate concentrations ($A_C$/F) of 8.6% and 10.8%, respectively. At these conditions and alginate concentrations, filter fouling was reduced to 2.1 and 1.9 kPa, while maintaining low agglomerates, low fines and high coating efficiency. In addition, the coating integrity, based on the 20-sec conductivity test, was particularly high for the cross-linked alginate, i.e., 46% for the 1.5% alginate and 56% for the 2.0% alginate, versus only 29% for the 2% non-cross-linked alginate.

TABLE 6

Formulations and process parameters to maximize spray rate
and minimize agglomeration for milk powder coatings

| Batch | Alginate (%) | Cross-linked? | $A_C$/F (%) | Nozzle Pressure (bar) | Spray Rate (g/min) |
|---|---|---|---|---|---|
| M | 0.0 | no | 0.0 | 4.0 | 14.0 |
| $MA_N^{2.0}$ | 2.0 | no | 0.0 | 4.0 | 14.0 |
| $MA_C^{0.5}$ | 0.5 | yes | 3.2 | 4.0 | 14.0 |
| $MA_C^{1.0}$ | 1.0 | yes | 6.1 | 4.0 | 14.0 |

TABLE 6-continued

Formulations and process parameters to maximize spray rate
and minimize agglomeration for milk powder coatings

| Batch | Alginate (%) | Cross-linked? | $A_C$/F (%) | Nozzle Pressure (bar) | Spray Rate (g/min) |
|---|---|---|---|---|---|
| $MA_C^{1.5}$ | 1.5 | yes | 8.6 | 4.0 | 14.0 |
| $MA_C^{2.0}$ | 2.0 | yes | 10.8 | 4.0 | 14.0 |

TABLE 7

Results of crosslinking milk powder coating runs in Table 6

| Batch | Agglomerates (%) | Fines (%) | Coating Efficiency (%) | Particle Size (µm) | Coating Integrity (%) @20 sec | Pressure Drop (kPa) |
|---|---|---|---|---|---|---|
| M | High | — | — | — | — | 5.0 |
| $MA_N^{2.0}$ | 1.95 | 0.00 | 90.5 | 354.0 | 29 | 4.4 |
| $MA_C^{0.5}$ | — | — | — | — | — | 5.0 |
| $MA_C^{1.0}$ | 0.76 | 0.76 | 85.1 | 345.6 | 37 | 4.8 |
| $MA_C^{1.5}$ | 1.02 | 1.02 | 87.0 | 352.4 | 46 | 2.1 |
| $MA_C^{2.0}$ | 1.68 | 1.68 | 94.2 | 354.0 | 56 | 1.9 |

Example 3. Formulation of Enzyme Coating Suspensions

Seven coating formulations containing enzyme fermentation broth as cargo were prepared: enzyme without alginate (E) fermentation broth, enzyme broth plus the cross-linking alginate formulation ($EA_C$) at varying alginate concentrations, enzyme broth plus the non-cross-linking alginate formulation ($EA_N$), enzyme broth plus 1% polyvinyl alcohol (EP), and enzyme broth plus the cross-linking alginate formulation and 1% polyvinyl alcohol ($EPA_C$) (Table 5). Enzyme feed coating suspensions were prepared to 2000 g. First, all carrier ingredients for the alginate premix were combined and mixed overnight to allow full hydration and dissolution of alginate. Additive was then added (if none, Milli-Q water was added) bringing up the coating suspension to 1000 g. Lastly, 1000 g of the enzyme fermentation broth suspension, containing 24% w/w total solids was mixed into the alginate and additive mixture, completing preparation of the feed coating suspension, with 12% w/w net enzyme fermentation broth cargo solids.

Prior to coating, 1000 g of aqueous enzyme ultrafiltration concentrate from fermentation broth was added, bringing the coating suspension to its final mass of 2000 g to achieve a total target cargo of 12% w/w enzyme fermentation broth solids in the feed coating suspension. The formulations are summarized in Table 8. All formulation included fermentation broth total solids, as cargo. The amount of alginate, succinic acid, calcium hydrogen phosphate, and the base used to adjust the succinic acid solution to pH 7.0 are indicated.

TABLE 8

| | Enzyme Solids (%) | Alginate (%) | Succinic acid (%) | Base | $CaHPO_4$ (%) | PVA (%) | Feed Solids (F) (%) | $A_C$/F (%) |
|---|---|---|---|---|---|---|---|---|
| Formulation | | | | | | | | |
| E | 12.0 | 0.0 | 0.0 | n/a | 0.0 | 0.0 | 12.0 | 0.0 |
| $EA_N^{2.0}$ | 12.0 | 2.0 | 1.0 | NaOH | 0.500 | 0.0 | 15.5 | 0.0 |
| $EA_C^{2.0}$ | 12.0 | 2.0 | 1.0 | $NH_4OH$ | 0.500 | 0.0 | 15.5 | 12.9 |
| $EA_C^{2.5}$ | 12.0 | 2.5 | 1.25 | $NH_4OH$ | 0.625 | 0.0 | 16.0 | 15.6 |
| $EA_C^{3.0}$ | 12.0 | 3.0 | 1.5 | $NH_4OH$ | 0.750 | 0.0 | 16.5 | 18.2 |
| EP | 12.0 | 0.0 | 0.0 | n/a | 0.000 | 1.0 | 13.0 | 0.0 |
| $EPA_C^{2.0}$ | 12.0 | 2.0 | 1.0 | $NH_4OH$ | 0.500 | 1.0 | 16.5 | 12.1 |

Enzyme feed coating suspension ingredients

The control parameters for enzyme coating batches from the optimized parameters found with non-fat dry milk were described in Example 2. Spray-coating of $EA_C$ formulations was performed with the following conditions: inlet temperature of 55-60° C., nozzle position set to 0, spray rate of 14 g/min, airflow flap set to 25 degrees, and nozzle pressure ranging from 1-4 bar. Spray-coating of enzyme was also performed at the same control parameters, however, only up to 2 bar nozzle pressure. As with the previous milk powder coating batches, nozzle pressures were explored to attain a desirable enzyme coated product that met the agglomeration and fines limits, with high coating efficiency and coating integrity. In addition, for the enzyme coated samples, mechanical strength of the particles was evaluated using the Heubach dust meter.

Enzyme coating suspensions of varying alginate concentrations, the non-cross-linking alginate formulation, and containing additives were spray-coated at 55-60° C. inlet temperature, 14 g/min spray rate and 25 degrees airflow flap. In-process parameters were monitored and recorded.

A preliminary set of runs was carried out to determine the optimum nozzle pressure. Table 6 shows a set of runs with enzyme only (E), and with 2% cross-linked alginate ($EA_C^{2.0}$), at nozzle pressures ranging from 1 to 4 bar. The resulting alginate to coating solids ratio ($A_C$/F) in granules produced at these conditions was 12.9%, as shown in Tables 15 and 16. Spraying the enzyme without alginate at 1 or 2 bar atomization resulted in acceptably low agglomeration, tively. Filter fouling and fines were also reduced. At 1 bar nozzle pressure, the agglomerates were 9.42%, while they were kept down to 0.37% at 2 bar. At nozzle pressures of 3 and 4 bar, however, the $EA_C^{2.0}$ coating resulted in increased fines and filter fouling, and very low coating efficiency. Thus, the optimum nozzle pressure for the enzyme spray was around 2 bar, somewhat lower than the 3.5-4 bar that produced the best results for the milk powder.

TABLE 9

Formulations and process parameters for optimizing enzyme coating quality and particle Heubach dust

| Batch | Alginate (% w/w) | Cross-link? | $A_C$/F (%) | Nozzle Pressure (bar) | Spray Rate (g/min) |
|---|---|---|---|---|---|
| E-p1 | 0.0 | no | 0.0 | 1.0 | 14.0 |
| E-p2 | 0.0 | no | 0.0 | 2.0 | 14.0 |
| $EA_C^{2.0}$-p1 | 2.0 | yes | 12.9 | 1.0 | 14.0 |
| $EA_C^{2.0}$-p2 | 2.0 | yes | 12.9 | 2.0 | 14.0 |
| $EA_C^{2.0}$-p3 | 2.0 | yes | 12.9 | 3.0 | 14.0 |
| $EA_C^{2.0}$-p4 | 2.0 | yes | 12.9 | 4.0 | 14.0 |

TABLE 10

Results of enzyme coating runs in Table 9

| Batch | Agglomerates (% w/w) | Fines (% w/w) | Coating Efficiency (%) | Particle Size (μm) | Coating Integrity (%) @20 sec | Filter Pressure (kPa) | Heubach Dust (mg/g) |
|---|---|---|---|---|---|---|---|
| E-p1 | 0.19 | 1.04 | 87.8 | 314.9 | 3 | 2.9 | 22.8 |
| E-p2 | 0.18 | 1.08 | 80.6 | 310.7 | 9 | 5.0 | 27.1 |
| $EA_C^{2.0}$-p1 | 9.42 | 0.66 | 92.8 | 339.1 | 61 | 1.0 | 3.8 |
| $EA_C^{2.0}$-p2 | 0.37 | 0.81 | 90.5 | 320.1 | 57 | 2.7 | 6.4 |
| $EA_C^{2.0}$-p3 | 0.17 | 3.05 | 71.2 | 307.8 | 52 | 4.8 | 4.9 |
| $EA_C^{2.0}$-p4 | 0.13 | 4.66 | 57.8 | 301.9 | 44 | 5.0 | 4.8 | fines and filter pressure, but resulted in a particle with very high Heubach dust (22.8 and 27.1 mg/g dust, respectively) and low coating integrity (0% and 5% retention vs. uncoated core at 20 seconds). Addition of 2.0% alginate to the enzyme feed, with cross-linking pre-mix, sprayed at 1 or 2 bar to induce in situ cross-linking, dramatically reduced the Heubach dust to 3.8 mg/g and 6.4 mg/g, respectively, and increased the coating integrity to 64% and 59%, respec- With the nozzle pressure optimized to 2.0 bar, and the spray rate set to the maximum 14 g/min, the effect of alginate level and cross-linking on the enzyme coating process and resulting product quality is summarized in Tables 11 and 12. The first line of Table 7 repeats the first line of Table 6, showing the coating of enzyme with no alginate, at a nozzle pressure of 2 bar, giving rise to a coated particle with very high Heubach dust and significant filter fouling. Adding 2% alginate reduces the Heubach dust, and maintains low filter fouling, but the coating integrity is only 12%. Cross-linking the 2% alginate keeps the Heubach dust low and further improves the coating integrity to 57%. At 2.5% and 3.0% alginate, corresponding to alginate levels in the coating ($A_C$/F) of 15.6% and 18.2%, respectively, Heubach dust is further reduced, to 2.2 and 2.1 mg/g, respectively, while maintaining good coating integrity and low filter fouling and fines. Thus, by incorporating 2-3% cross-linked alginate into the enzyme feed, at an optimum nozzle pressure of 2 bar, enzyme can be sprayed at a high rate of 14 g/min, while maintaining high coating efficiency, no filter fouling, low fines and agglomerates, and excellent mechanical strength.

TABLE 11

Formulations and process parameters for optimizing enzyme coating process and product quality

| Batch | Alginate (%) | Cross-linked? | $A_C$/F (%) | Nozzle Pressure (bar) | Spray Rate (g/min) |
|---|---|---|---|---|---|
| E-p2 | 0.0 | no | 0.0 | 2.0 | 14.0 |
| $EA_N^{2.0}$-p2 | 2.0 | no | 0.0 | 2.0 | 14.0 |
| $EA_C^{2.0}$-p2 | 2.0 | yes | 12.9 | 2.0 | 14.0 |
| $EA_C^{2.5}$-p2 | 2.5 | yes | 15.6 | 2.0 | 14.0 |
| $EA_C^{3.0}$-p2 | 3.0 | yes | 18.2 | 2.0 | 14.0 |

TABLE 12

Results of enzyme coating runs in Table 11

| Batch | Agglomerates (%) | Fines (%) | Coating Efficiency (%) | Particle Size (μm) | Coating Integrity (%) @20 sec | Pressure Drop kPa | Heubach Dust (mg/g) |
|---|---|---|---|---|---|---|---|
| E-p2 | 0.18 | 1.08 | 80.6 | 310.7 | 9 | 5.0 | 27.1 |
| $EA_N^{2.0}$-p2 | 0.26 | 0.11 | 97.9 | 322.7 | 12 | 2.4 | 3.1 |
| $EA_C^{2.0}$-p2 | 0.37 | 0.81 | 90.5 | 320.1 | 57 | 2.7 | 6.4 |
| $EA_C^{2.5}$-p2 | 1.31 | 1.00 | 90.2 | 320.0 | 32 | 2.9 | 2.2 |
| $EA_C^{3.0}$-p2 | 2.10 | 1.52 | 86.4 | 316.9 | 26 | 3.1 | 2.1 |

Figure 4:
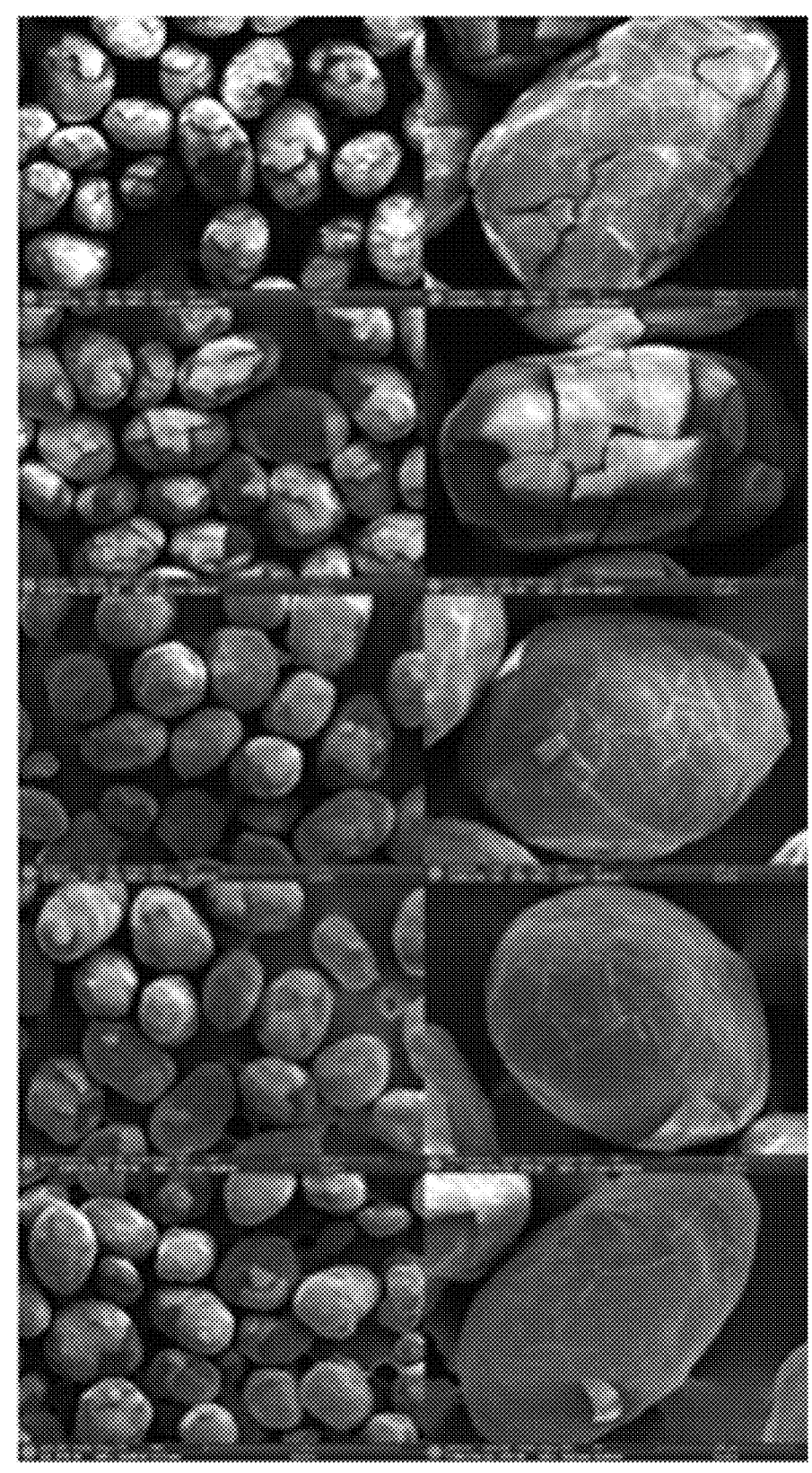
FIG. 4 is a set of scanning electron micrographs (SEMs) of enzyme-coated cores, all sprayed at 2 bar nozzle pressure (–p2) for enzyme without alginate (E), enzyme with non-cross-linked alginate ($EA_N$) added at 2.0% of the feed suspension, and enzyme with cross-linked alginate ($EA_C$) added at 2.0%, 2.5% and 3.0% of the feed suspension.

FIG. 4 shows SEM micrographs of the enzyme coated core batches produced in Tables 11 and 12. The SEM images illustrate the physical improvement to enzyme granule coating integrity resulting from incorporation of in situ cross-linked alginate. The images in FIG. 4 reveal a reduction in surface cracking and coating integrity by incorporation of in-situ cross-linking alginate in the enzyme, relative to the enzyme-only coating. As levels of cross-linked alginate in the feed are increased from 2% ($EA_C^{2.0}$-p2) to 3% (Batch $EA_C^{3.0}$-p2), the size and frequency of cracks and missing chunks diminish to where coating surfaces appear to have small scratches, rather than deep cracks, and begin to look smoother overall.

Example 5. Effect of PVA on In-Process Parameters and Product Quality

Figure 3:
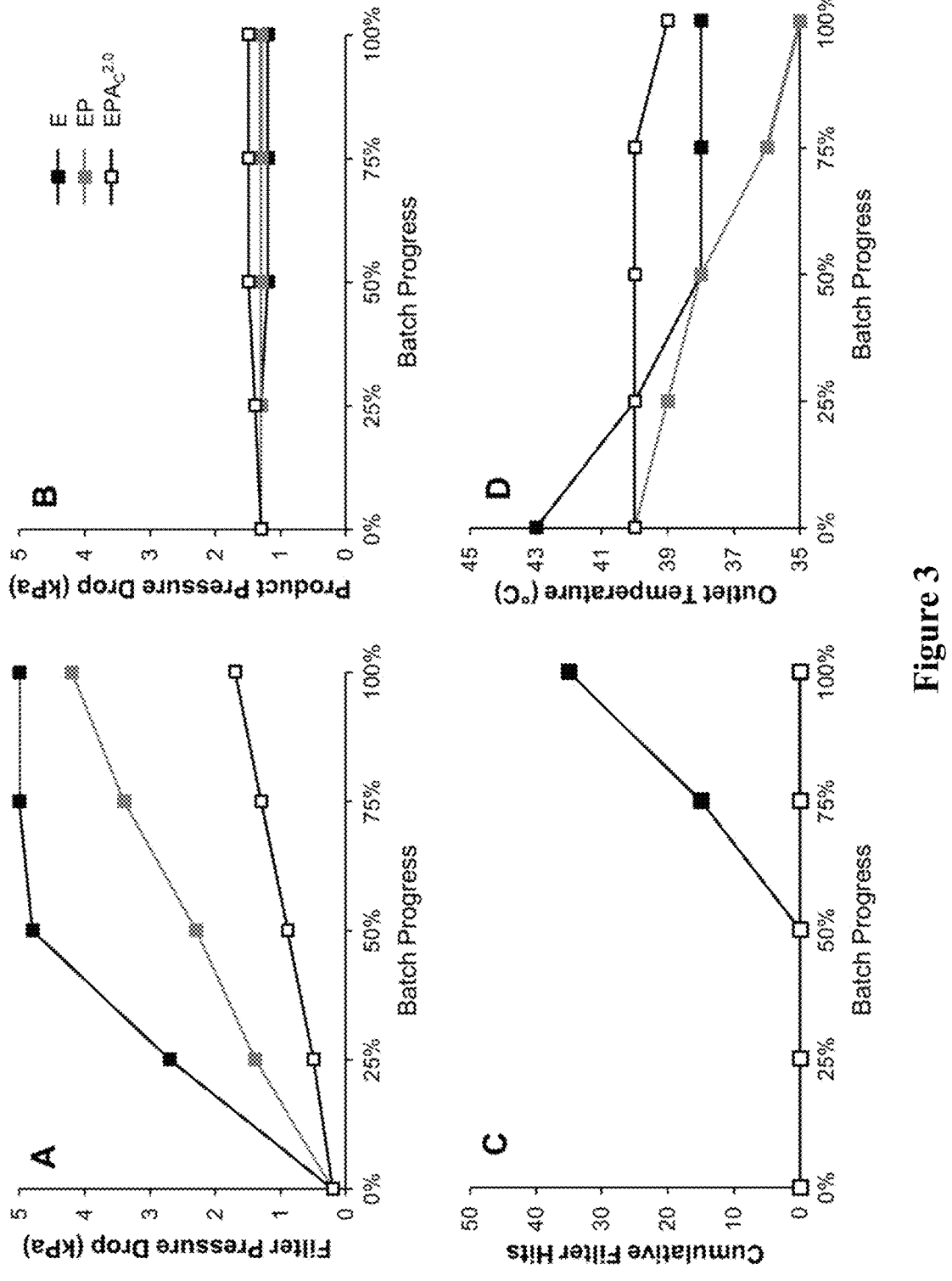
FIGS. 3A-3D show graphs summarizing indicators of dust generation for enzyme formulations incorporating 1% PVA. The parameters measured were filter pressure drop (3A), product pressure drop (3B), cumulative filter hits (3C), and outlet temperature (3D).

Polyvinyl alcohol (PVA) was examined for its ability to improve coating quality and product characteristics. Polyvinyl alcohol is commonly used as a binder in spray-coated enzyme formulations. The effect of PVA alone and PVA combined with cross-linked alginate is summarized in the three batches shown in Tables 13 and 14, all sprayed at 14 g/min and a nozzle pressure of 2 bar. Including 1% PVA in the enzyme coating significantly reduced Heubach dust from 27.1 mg/g (for E alone) to 4.8 mg/g (for EP) and removed any need for filter hits, but still caused pressure-drop across the filter to reach 4 kPa (FIGS. 3A and 3C). The further addition of 2% cross-linking alginate to the enzyme-PVA feed suspension ($EPA_C^{2.0}$), resulted in an enzyme-PVA coating with an alginate/coating solids concentration ($A_C$/F) of 12.5%, as indicated in Table 5. It is noteworthy is that the incorporation of cross-linked alginate in $EPA_C^{2.0}$ further reduced the Heubach dust to 1.9 mg/g, which is less than half of that of the enzyme-PVA coated particle ($EPA_C^{2.0}$), and 93% lower than that of the enzyme-only coated particle (E).

The process performance of $EPA_C^{2.0}$ also required no filter hits and stabilized the pressure-drop across the filter at below 2 kPa. Outlet temperatures were approximately 40° C. for E and $EPA_C$ and as low as 36° C. for EP (FIG. 3D). Both formulations containing PVA boosted coating efficiency by 7-8% over the enzyme-only coated sample (E), despite the increase of sieving fines, but each had a coating integrity of only 8-9%. And the formulation containing both PVA and cross-linked alginate had a significantly higher coating integrity, retaining 31% of the conductivity of the uncoated core at 20 seconds dissolution.

TABLE 13

Formulations and process parameters for enzyme coatings with and without PVA

| Batch | PVA (% w/w) | Cross-linked Alginate (% w/w) | $A_C$/F (%) | Nozzle Pressure (bar) | Spray Rate (g/min) |
|---|---|---|---|---|---|
| E | 0.0 | 0.0 | 0.0 | 2.0 | 14.0 |
| EP | 1.0 | 0.0 | 0.0 | 2.0 | 14.0 |
| $EPA_C^{2.0}$ | 1.0 | 2.0 | 12.1 | 2.0 | 14.0 |

TABLE 14

| | | | | Results of enzyme coating runs with and without PVA in Table 13 | | | |
|---|---|---|---|---|---|---|---|
| Batch | Agglomerates (% w/w) | Fines (% w/w) | Coating Efficiency (%) | Particle Size (um) | Coating Integrity @20 sec | Filter Pressure (kPa) | Heubach Dust (mg/g) |
| E | 0.18 | 1.08 | 80.6 | 310.7 | 9% | 5.0 | 27.1 |
| EP | 0.26 | 1.34 | 88.1 | 310.6 | 8% | 4.2 | 4.8 |
| $EPA_C^{2.0}$ | 1.25 | 1.66 | 87.1 | 313.2 | 31% | 1.7 | 1.9 |

Figure 5:
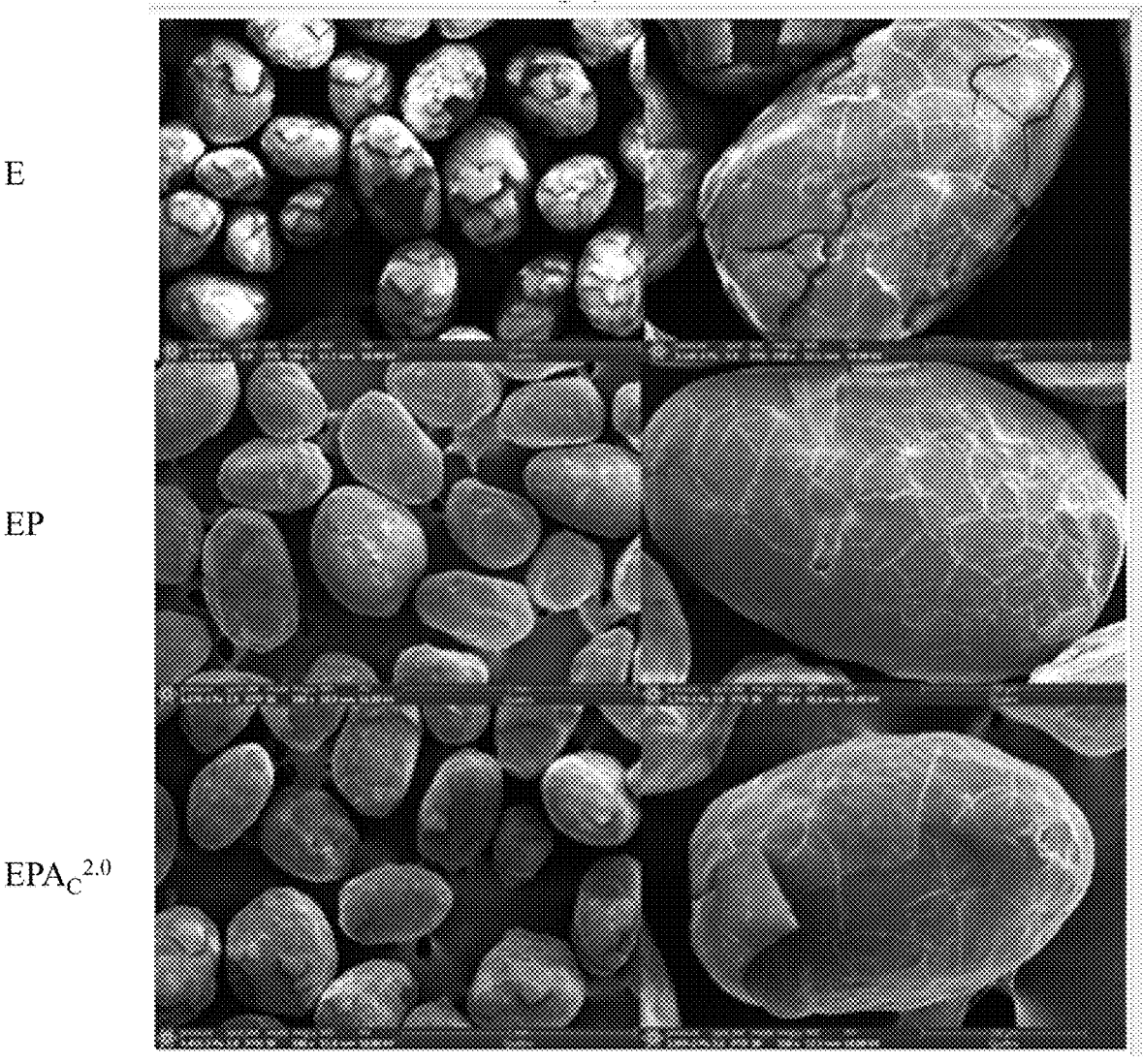
FIG. 5 is a set of SEMs of enzyme-coated cores, all sprayed at 2 bar nozzle pressure, for enzyme without alginate (E), enzyme with PVA but no alginate (EP) and enzyme with PVA and 2.0% cross-linked alginate ($EA_C^{2.0}$) added at 2.0% of the feed suspension.

FIG. 5 shows SEM micrographs of the enzyme granules listed in Tables 13 and 14. The SEM images revealed the elimination of broken coatings seen for enzyme-only coated particles (E), by the addition of 1% PVA to the coatings (EP), which also resulted in a smoother coating appearance. Including both cross-linked alginate and PVA in the enzyme coating ($EPA_C^{2.0}$) further reduced frequency and depth of surface cracks.

In summary, in fluidized bed spray-coating processes, it is desirable to achieve a high spray rate per nozzle, while maintaining low agglomerates and fines, high coating efficiency and coating integrity, and a coated particle with high mechanical strength, as indicated by a low Heubach dust. The desirable target thresholds for these parameters are summarized in Table 15.

TABLE 15

Desirable process performance and product property targets for spray-coated enzyme granules

| Parameter | Unit | Target |
|---|---|---|
| Spray rate per nozzle | g/min | ≥12 |
| Filter pressure drop | kPa | ≤3.0 |
| Agglomerates | % w/w | <2 |
| Fines | % w/w | <2 |
| Coating efficiency | % | >85% |
| Coating integrity | @20 sec | >25% |
| Heubach dust | mg/g | <7 mg/g |

The present invention provides a means of coating enzymes or other cargo onto cores at high spray rates, with high coating efficiency, low levels of agglomerates and low levels of fines, to produce coated particles with excellent coating integrity and low tendency to generate attrition dust, as measured by the Heubach dust test. The targets in Table 15 summarize target measures for enzyme coating processes and enzyme-coated cores. By means of in situ alginate cross-linking within the coating process of the invention, all of these targets were achieved simultaneously, with no or minimal compromise. This CLAMshell process can be applied to produce coated particle formulations for different enzymes, proteins and other benefit agents by incorporating alginate at a range between about 1.5-3.0% into the feed, and spray atomizing the feed at nozzle pressure of between about 2-4 bar to coat cores in a fluidized bed spray-coating process. This process results in coated particles with about 8-20% cross-linked alginate in the coating, as a percent of total coating solids. The optimum range for the alginate concentration and nozzle pressure may be somewhat narrower depending on the cargo of interest, e.g. for the milk powder, enzyme, and enzyme plus PVA combinations, as described in the above examples and summarized in Table 16. Optimizing within these ranges requires minimal effort for the skilled person, and in any case produces superior results over what can be achieved in coating of the same cargo without any in situ cross-linked alginate incorporated into the coating.

TABLE 16

Optimal ranges for alginate concentration and spray nozzle atomization pressures to achieve high spray rates and desirable process and product properties for milk powder (M), enzyme (E) and enzyme plus PVA (EP) coatings.

| Parameter | Symbol | Units | M | E | EP | Overall |
|---|---|---|---|---|---|---|
| Alginate suspension concentration | $A_C$ | % w/w | 1.5-2.0 | 2.0-3.0 | ≥2 | 1.5-3.0 |
| Alginate concentration in coating | $A_C/F$ | % w/w | 8.3-10.8 | 12.9-18.2 | ≥12.1 | 8.0-20.0 |
| Nozzle pressure | p | bar | 3.5-4.0 | 2.0-2.5 | 2.0-2.5 | 2.0-4.0 |

All documents cited herein and/or listed, below, are hereby incorporated by reference.

REFERENCES

[1] O. Kirk, T. V. Borchert, C. C. Fuglsang, Industrial enzyme applications, Current Opinion in Biotechnology, 13 (2002) 345-351.

[2] S. Li, X. Yang, S. Yang, M. Zhu, X. Wang, Technology prospecting on enzymes: application, marketing and engineering, Computational and structural biotechnology journal, 2 (2012) e201209017-e201209017.

[3] J. B, van Beilen, Z. Li, Enzyme technology: an overview, Current Opinion in Biotechnology, 13 (2002) 338-344.

[4] K. Dewettinck, A. Huyghebaert, Fluidized bed coating in food technology, Trends in Food Science & Technology, 10 (1999) 163-168.

[5] F. Nazzaro, P. Orlando, F. Fratianni, R. Coppola, Micro-encapsulation in food science and biotechnology, Current Opinion in Biotechnology, 23 (2012) 182-186.

[6] M. Santa-Maria, H. Scher, T. Jeoh, Microencapsulation of bioactives in cross-linked alginate matrices by spray drying, Journal of Microencapsulation, (2012).

[7] B. A. Slominski, Recent advances in research on enzymes for poultry diets, Poultry Science, 90 (2011) 2013-2023.

[8] M. Misbah, I. I. Muhamad, S. Shaharuddin, A. A. Rasid, Coating of Mixed Commercial β-Mannanase and Phytase through Spraying on Capra Hircus Pelleted Feed, Agriculture and Agricultural Science Procedia, 2 (2014) 102-106.

[9] H. Ahmadian, M. Ghadiri, Analysis of enzyme dust formation in detergent manufacturing plants, Advanced Powder Technology, 18 (2007) 53-67.

[10] A. W. J. Chan, T. Becker, R. J. Neufeld, Subtilisin absorptive encapsulation and granulation, Process Biochemistry, 40 (2005) 1903-1910.

[11] A. W. J. Chan, I. Mazeaud, T. Becker, R. J. Neufeld, Granulation of subtilisin by internal gelation of alginate microspheres for application in detergent formulation, Enzyme and Microbial Technology, 38 (2006) 265-272.

[12] B. Guignon, A. Duquenoy, E. D. Dumoulin, Fluid Bed Encapsulation of Particles: Principles and Practice, Drying Technology, 20 (2002) 419-447.

[13] E. Teunou, D. Poncelet, Batch and continuous fluid bed coating—review and state of the art, Journal of Food Engineering, 53 (2002) 325-340.

[14] D. E. Wurster, Means for applying coatings to tablets or the like, U.S. Pat. No. 2,799,241, 1957.

[15] R. E. Arnold, N. T. Becker, M. G. Boston, A. Mansikkamaki, C. M. Simpson, D. J. Wendt, Enzyme-containing granules coated with hydrolyzed polyvinyl alcohol or copolymer thereof, U.S. Pat. No. 5,324,649, 1994.

[16] N. T. Becker, R. P. Crowley, Process for making dust-free enzyme-containing particles from an enzyme-containing fermentation broth, U.S. Pat. No. 5,814,501, 1998.

[17] D. A. Dale, A. L. Gaertner, G. Park, N. T. Becker, Coated enzyme-containing granule, U.S. Pat. No. 5,879,920, 1999.

[18] T. Ishikawa, S. Kuroda, J. Kozuka, S. Shikata, M. Nomura, Process for the production of enzyme granules, WO patent 1998001544, 1998.

[19] T. Kiuchi, K. Sano, M. Sato, J. Kawamura, N. Yamada, Enzyme-containing granulated substance and preparation process thereof, U.S. Pat. No. 5,851,975, 1998.

[20] E. K. Markussen, Enzyme containing granule, U.S. Pat. No. 6,602,843, 2003.

[21] E. K. Markussen, A. D. Fog, Enzyme containing granulates useful as detergent additives, U.S. Pat. No. 4,661,452, 1987.

[22] P. D. Hede, P. Bach, A. D. Jensen, Small-scale top-spray fluidised bed coating: Granule impact strength, agglomeration tendency and coating layer morphology, Powder Technology, 176 (2007) 156-167.

[23] P. D. Hede, P. Bach, A. D. Jensen, Fluidized-Bed Coating with Sodium Sulfate and PVA— TiO2, 1. Review and Agglomeration Regime Maps, Industrial & Engineering Chemistry Research, 48 (2009) 1893-1904.

[24] P. D. Hede, P. Bach, A. D. Jensen, Fluidized-Bed Coating with Sodium Sulfate and PVA— TiO2, 2. Influence of Coating Solution Viscosity, Stickiness, pH, and Droplet Diameter on Agglomeration, Industrial & Engineering Chemistry Research, 48 (2009) 1905-1913.

[25] P. D. Hede, P. Bach, A. D. Jensen, Fluidized-Bed Coating with Sodium Sulfate and PVA— TiO2, 3. The Role of Tackiness and the Tack Stokes Number, Industrial & Engineering Chemistry Research, 48 (2009) 1914-1920.

[26] H. Kage, M. Dohzaki, H. Ogura, Y. Matsuno, Powder coating efficiency of small particles and their agglomeration in circulating fluidized bed, Korean Journal of Chemical Engineering, 16 (1999) 630-634.

[27] K. Dewettinck, L. Deroo, W. Messens, A. Huyghebaert, Agglomeration Tendency during Top-Spray Fluidized Bed Coating with Gums, LWT—Food Science and Technology, 31 (1998) 576-584.

[28] K. Dewettinck, A. Huyghebaert, Top-Spray Fluidized Bed Coating: Effect of Process Variables on Coating Efficiency, LWT—Food Science and Technology, 31 (1998) 568-575.

[29] K. I. Draget, C. Taylor, Chemical, physical and biological properties of alginates and their biomedical implications, Food Hydrocolloids, 25 (2011) 251-256.

[30] K. Y. Lee, D. J. Mooney, Alginate: properties and biomedical applications, Prog Polym Sci, 37 (2012) 106-126.

[31] T. Jeoh-Zicari, H. B. Scher, M. C. Santa-Maria, S. Strobel, Spray dry method for encapsulation of biological moieties and chemicals in polymers cross-linked by multivalent ions for controlled release applications, U.S. Pat. No. 10,610,492, 2020.

[32] S. A. Strobel, H. B. Scher, N. Nitin, T. Jeoh, Control of physicochemical and cargo release properties of cross-linked alginate microcapsules formed by spray-drying, Journal of Drug Delivery Science and Technology, 49 (2019) 440-447.

[33] D. E. Wong, J. C. Cunniffe, H. B. Scher, T. Jeoh, Controlling swelling and release of hyaluronic acid during aqueous storage by in situ cross-linking during spray drying with alginate, bioRxiv, (2019) 679589.

[34] S. A. Strobel, H. B. Scher, N. Nitin, T. Jeoh, In situ cross-linking of alginate during spray-drying to microencapsulate lipids in powder, Food Hydrocolloids, 58 (2016) 141-149.

[35] S. A. Strobel, K. Hudnall, B. Arbaugh, J. C. Cunniffe, H. B. Scher, T. Jeoh, Stability of Fish Oil in Calcium Alginate Microcapsules Cross-Linked by In Situ Internal Gelation During Spray Drying, Food and Bioprocess Technology, 13 (2020) 275-287.

[36] S. A. Strobel, K. Allen, C. Roberts, D. Jimenez, H. B. Scher, T. Jeoh, Industrially-Scalable Microencapsulation of Plant Beneficial Bacteria in Dry Cross-Linked Alginate Matrix, Industrial Biotechnology, 14 (2018) 138-147.

[37] S. ASAE, Method of determining and expressing fineness of feed materials by sieving, Am. Soc. Agric. Eng. St. Joseph, M I., 1983.

[38] T. Jeoh, S. Scott, H. Kevin, P. Nadia, W. Kyle, A. Benjamin, C. Julia, S. Herbert, How alginate properties influence in situ internal gelation in Crosslinked Alginate Microcapsules (CLAMs) formed by spray drying, 2020.

[39] P. D. Hede, P. Bach, A. Jensen, Two-fluid spray atomisation and pneumatic nozzles for fluid bed coating/agglomeration purposes: A review, Chemical Engineering Science, 63 (2008) 3821-3842.

[40] A. van Kampen, B. Hitzmann, R. Kohlus, Assessment of coating quality by use of dissolution kinetics, Powder Technology, 286 (2015) 325-331.

[41] L. Agüler, D. Zaldivar-Silva, L. Peña, M. L. Dias, Alginate microparticles as oral colon drug delivery device: A review, Carbohydrate Polymers, 168 (2017) 32-43.

[42] M. T. Cook, G. Tzortzis, D. Charalampopoulos, V. V. Khutoryanskiy, Microencapsulation of probiotics for gastrointestinal delivery, Journal of Controlled Release, 162 (2012) 56-67.

[43] K. Christoph Link, E.-U. Schlünder, Fluidized bed spray granulation: Investigation of the coating process on a single sphere, Chemical Engineering and Processing: Process Intensification, 36 (1997) 443-457.

[44] Y. F. Maa, C. C. Hsu, Feasibility of protein spray coating using a fluid-bed Wurster processor, Biotechnology and bioengineering, 53 (1997) 560-566.

[45] T. Bonakdar, M. Ghadiri, H. Ahmadian, P. Bach, Impact strength distribution of placebo enzyme granules, Powder Technology, 285 (2015) 68-73.

[46] K. Jørgensen, P. Bach, A. D. Jensen, Impact and attrition shear breakage of enzyme granules and placebo particles-application to particle design and formulation, Powder Technology, 149 (2005) 157-167.

What is claimed is:

1. A method for applying cross-linked coatings comprising a benefit agent onto granular core material, comprising:

providing a feed suspension comprising a cross-linkable polymer, an acid neutralized with a volatile base, and a calcium salt insoluble at the pH of the neutralized feed suspension; and atomizing the feed suspension in a fluidized-bed spray-coater operated in Wurster mode so as to contact, deposit and coat the atomized feed suspension onto the granular core material;

wherein upon atomization and contacting of the feed suspension with the cores, volatilization of the volatile base lowers the pH of the feed suspension, solubilizing the calcium salt and enabling ion-mediated cross-linking of the cross-linkable polymer to form a cross-linked coating layer on the granular core material.

2. The method of claim 1, wherein the coating apparatus is a fluidized bed spray coater.

3. The method of claim 1, wherein the feed suspension is atomized and delivered at a nozzle pressure of 1-4 bar.

4. The method of claim 3, wherein the amount of cross-linkable polymer in the feed suspension is at least about 2.5%.

5. The method of claim 4, wherein the amount of cross-linkable polymer in the feed suspension is between about 1.5% and 3.0%.

6. The method of claim 5, wherein the amount of cross-linkable polymer in the coating is at least about 8% and less than about 20%.

7. The method of claim 6, wherein the feed suspension further comprises a hydrophobic compound.

8. The method of claim 6, wherein the cross-linkable polymer is selected from the group consisting of alginate, carrageenan, pectin, agar, starch, xanthan gum, guar gum, gum arabic, glactomannans, and proteins such as gelatin, collagen, casein, zein, soy protein, whey protein, potato protein, album, or derivatives thereof; and synthetic polymers such as carboxymethyl cellulose, polyaspartic acid, polyglutamic acid, polyacrylic acid, polymethacrylic acid, and copolymers thereof.

9. The method of claim 6, wherein the cross-linkable polymer is alginate, or a derivative, thereof.

10. The method of claim 9, wherein the calcium salt is selected from the group consisting of di calcium phosphate, calcium carbonate, calcium oxalate, calcium phosphate, calcium meta-silicate, calcium tartrate and combinations, thereof.

11. The method of claim 10, wherein the acid is an organic acid selected from the group consisting of adipic acid, acrylic acid, glutaric acid, succinic acid, ascorbic acid, gallic acid, caffeic acid and combinations, thereof.

12. The method of claim 11, wherein the volatile base is selected from the group consisting of ammonia, methylamine, trimethylamine, ethylamine, diethylamine, and trimethylamine and combinations, thereof.

13. The method of claim 12, wherein the cores comprise a material selected from the group consisting of sodium sulfate or other inorganic salts, sucrose or other sugars or sugar alcohols, clay or other minerals or combinations, thereof.

14. The method of claim 13, further comprising applying an additional coating layer over the cross-linkable polymer-containing coating layer on the granular core material.

15. The method of claim 14, wherein the additional coating comprises polyvinyl alcohol.

16. The method of claim 15, wherein the feed suspension further comprises a benefit agent.

17. The method of claim 16, wherein the benefit agent is a protein.

18. The method of claim 16, wherein the benefit agent is an enzyme.

19. The method of claim 16, wherein the benefit agent is a microorganism.

20. The method of claim 16, wherein the benefit agent is small molecule.

21. The method of claim 18, wherein the cores comprise a benefit agent.

22. The method of claim 18, wherein the cores do not comprise a benefit agent.

23. The method of claim 21, wherein the cross-linkable polymer is selected from the group consisting of alginate, carrngeenan, pectin, agar, starch, xanthan gum, guar gum, gum arabic, glactomannans, and proteins such as gelatin, collagen, casein, zein, soy protein, whey protein, potato protein, album, or derivatives thereof; and synthetic polymers such as carboxymethyl cellulose, polyaspartic acid, polyglutamic acid, polyacrylic acid, polymethacrylic acid, and copolymers thereof.

24. The method of claim 23, wherein the cross-linkable polymer is alginate, or a derivative, thereof.

25. Particles produced by the method of claim 24.

* * * * *